US011755605B2

(12) United States Patent
Schmidt et al.

(10) Patent No.: US 11,755,605 B2
(45) Date of Patent: Sep. 12, 2023

(54) CONTROLLING TECHNICAL EQUIPMENT THROUGH QUALITY INDICATORS USING PARAMETERIZED BATCH-RUN MONITORING

(71) Applicant: ABB SCHWEIZ AG, Baden (CH)

(72) Inventors: Benedikt Schmidt, Heidelberg (DE); Martin Hollender, Dossenheim (DE); Sylvia Maczey, Hirschberg (DE)

(73) Assignee: ABB Schweiz AG, Baden (CH)

( * ) Notice: Subject to any disclaimer, the term of this patent is extended or adjusted under 35 U.S.C. 154(b) by 37 days.

(21) Appl. No.: 17/500,972

(22) Filed: Oct. 14, 2021

(65) Prior Publication Data
US 2022/0035810 A1 Feb. 3, 2022

Related U.S. Application Data

(63) Continuation of application No. PCT/EP2020/060266, filed on Apr. 9, 2020.

(30) Foreign Application Priority Data

Apr. 17, 2019 (EP) .................................... 19169993

(51) Int. Cl.
*G06F 16/00* (2019.01)
*G06F 16/2458* (2019.01)
(Continued)

(52) U.S. Cl.
CPC ..... *G06F 16/2477* (2019.01); *G05B 19/4183* (2013.01); *G06F 16/2379* (2019.01); *G06F 16/24556* (2019.01)

(58) Field of Classification Search
CPC ........... G06F 16/2379; G06F 16/24556; G06F 16/2477; G05B 19/4183; G05B 19/41875;
(Continued)

(56) References Cited

U.S. PATENT DOCUMENTS 5,727,128 A    3/1998 Morrison
6,901,303 B2 * 5/2005 Larson .................... G06F 11/24
                                              714/E11.154
(Continued)

FOREIGN PATENT DOCUMENTS

CN    104808648 A     7/2015
WO    2008/014349 A1  1/2008

OTHER PUBLICATIONS

González-Martínez, "Using warping information for batch process monitoring and fault classification," *Chemometrics and Intelligent Laboratory Systems*, 127: 210-217 (Aug. 15, 2013).

(Continued)

*Primary Examiner* — Vincent F Boccio
(74) *Attorney, Agent, or Firm* — Leydig, Voit & Mayer, Ltd.

(57) ABSTRACT

A control module is adapted to control technical equipment by processing batch-run data from the technical equipment. The control module operates according to parameters that are obtained by a parameter module. The module receives a reference plurality of multi-variate reference time series with data values from sources that are related to the equipment. There are time series with measurement values and time series with data that describes particular manufacturing operations during a batch-run time interval. The module splits the time interval into phases by determining transitions between the particular manufacturing operations, and divides the time series into particular phase-specific partial series. For each phase separately, and for the phase-specific partial series in combination, the module differentiates phase-specific time series into relevant partial time series or non-relevant partial time series and set the parameters accordingly.

12 Claims, 11 Drawing Sheets

(51) Int. Cl.
*G06F 16/23* (2019.01)
*G06F 16/2455* (2019.01)
*G05B 19/418* (2006.01)

(58) Field of Classification Search
CPC .......... G05B 2219/32077; G05B 2219/32201; G05B 2219/31265
USPC ........................................................ 707/769
See application file for complete search history.

(56) References Cited

U.S. PATENT DOCUMENTS

| | | | |
|---|---|---|---|
| 2010/0017008 A1 | 1/2010 | Yelchuru et al. | |
| 2011/0288660 A1 | 11/2011 | Wojsznis et al. | |
| 2011/0288837 A1* | 11/2011 | Blevins ................. | G05B 17/02 703/6 |
| 2012/0059526 A1* | 3/2012 | Maini .................... | G06Q 50/06 700/291 |
| 2015/0005903 A1* | 1/2015 | Worek ............. | G05B 19/41885 700/44 |
| 2016/0098234 A1* | 4/2016 | Weaver ................. | G06F 3/121 358/1.15 |
| 2018/0324065 A1* | 11/2018 | Ritchie ................ | H04L 43/045 |

OTHER PUBLICATIONS

Kosanovich, "Multi-Way PCA Applied to an Industrial Batch Process," *Proceedings of the American Control Conference IEEE*, pp. 1294-1298 (Jun. 29, 1994).

Nomikos, "Monitoring Batch Processes Using Multiway Principal Component Analysis," *American Institute of Chemical Engineers J.*, 40(8): 1361-1375 (Aug. 1994).

Perk, "Batch Process Monitoring Using Multiblock Multiway Principal Component Analysis," *IFAC Proceedings Volumes*, 39(2): 209-214 (Apr. 2-5, 2006).

Wang, "Multi-phase MPCA modeling and application based on an improved phase separation method," *International J. of Control, Automation and Systems*, 10(6): 1136-1145 (Dec. 5, 2012).

European Patent Office, Extended European Search Report in European Application No. 19169993.3, 8 pp. (dated Oct. 28, 2019).

European Patent Office, International Search Report in International Patent Application No. PCT/EP2020/060266, 3 pp. (dated Jun. 23, 2020).

European Patent Office, Written Opinion in International Patent Application No. PCT/EP2020/060266, 8 pp. (dated Jun. 23, 2020).

Intellectual Property India, Examination Report in Indian Patent Application No. 202147046574, 8 pp. (dated Mar. 23, 2022).

* cited by examiner

CONTROLLING TECHNICAL EQUIPMENT THROUGH QUALITY INDICATORS USING PARAMETERIZED BATCH-RUN MONITORING

CROSS-REFERENCE TO PRIOR APPLICATIONS

This application is a continuation of International Patent Application No. PCT/EP2020/060266, filed on Apr. 9, 2020, which claims priority to European Patent Application No. EP 19169993.3, filed on Apr. 17, 2019. The entire disclosure of both applications is hereby incorporated by reference herein.

FIELD

In general, the disclosure relates to production processes, and more in particular, the disclosure relates to computer systems, methods and computer-program products to determine quality indicators to control the performance of batch-runs in a production process.

BACKGROUND

In industry, technical systems perform production processes. It is desired that the production processes are in conformity (or "compliance") with pre-defined specifications. However, this is not always the case. Therefore, quality indicators can be related to particular performances (or "batch-runs") of the production processes.

Simplified, quality indicators can differentiate—at least—between conforming production and non-conforming production. Conformance is usually associated with the indicator "success (S)" and non-conformance is usually associated with the indicator "failure (F)". Quality indicators represent the internal state of the technical system that performs the production process.

Collecting data during production can support improvements (in the performance of the process). Data can result from measurement signals (e.g., the temperature of a production apparatus, pressure within the apparatus), from control instructions that are related to production events (e.g. to open or to close a particular valve, to add material), or from status indicators.

As batch processing is widely adopted in particular industries, such as in chemical industry, data can be collected for individual batches. Conventions regarding batch control are standardized, such as in ANSI/ISA-88 and equivalents (e.g., IEC 61512-1:1997, IEC 61512-2:2001, IEC 61512-3:2008, IEC 61512-4:2009).

For batch processing, data is available as time series, i.e. series of data values indexed in time order for subsequent time points. Time series are related to particular batches and/or related to the resulting products. The time series (or arrays) are usually available as multi-variate time series.

Evaluating the data can comprise the detection of similarities between time series from different batch-runs. For example, while a batch is being processed by technical equipment, data of the current batch-run is being compared to data of reference batches with a known quality indicator, such as "success (S)" or "failure (F)", "normal" or "abnormal" etc. If the data of the current batch-run is similar to the data of a (F) reference batch-run, the operator of the equipment may interfere and can potentially turn the current batch-run into (S).

However, there are reasons that complicate the evaluation. For example, there is a relatively large amount of data to evaluate, and individual values are looked at in combination (for example, temperature values are evaluated in combination with other values, such a pressure values).

Further, the operator of the technical equipment does not have time to investigate the data as it arrives. The computer aggregates the data into a status indicator (of the technical equipment being a technical system), and thereby assists the operator. The aggregation can lead to visualization.

Also, comparing batches—such as comparing the current batch to reference batches—should be handed over to the computers that provide a comparison result (as the status indicators).

Computer tools can process input data (from one or more batch-runs) into output data according to pre-defined rules (sometimes called "models"). The rules use pre-defined parameters.

Some tools can use correlation, coordinate transformation etc. as part of the rules and provide visualization (or other form of representation) of data-relations as output.

Some other tools can use batch-run data as input, from the current batch-run and from reference batch-runs; and can provide similarity indicators as output.

Frequently, the calculation approach is known in the art. The settings are specialized to the particular production process that the technical equipment performs.

For example, for ultra-high temperature processing (UHT) milk, the technical equipment is a heater that heats up the milk above a particular temperature during a particular time interval. Simplified, the computer tool has an input to receive a time series,
a rule unit with a comparator (with the threshold as a first parameter) and a counter (stopwatch, duration as the second parameter), and
an output to provide the quality indicator.

In operation, the computer tool receives a time series with temperature values as input from the heater, parameters from a technical standard (e.g., temperature 135° C. for 3 seconds) and provides the quality indicator in form of a conformity statement. In a more sophisticated example, the tool would send the time series of temperature values to a display that also shows a threshold line. The operator would easily recognize a deviation. The tool can be set up with parameters by a human expert (in the food processing domain).

However, for most of production batches, the there is much more data (as input) and the involvement of human experts (with domain knowledge) to obtain the appropriate parameters is limited. Reducing the number of variables is one approach of the rules, and the rules can comprise the application of processing steps. But the rules require parameters on how input data is to be processed. At the output, visualization gives further support.

For example, the tool can display a two-dimensional diagram. For example, datancan be visualized by dots. A dot does no longer stand for a single input or for a combination of two input values, but for a numerical value that results from the application of the rules, including aggregating. Dots appearing clustered in the right upper quadrant of the diagram may indicate that the batch-run is (or was) running normally. Dots moving to a different quadrant may indicate that batches are experiencing a deviation from normal.

It is even possible to apply calculation conventions by that relations between input values are transformed into graphical elements. It is then possible to apply relatively simple methods of geometry, such as Euclidian geometry, to distances between dots. There is even no need to display the graphics.

However, if some parameters are selected inappropriately, the output may be disturbed. In the UHT milk example, a parameter may let the tool take the origin of the milk (the pasture being near the sea or in the mountains) and or the transportation time (from the cow to the heater) as a further input. The tool might still display dots in a particular quadrant, but the dots might move as the cows eat more herbs from the mountains.

The human expert knows that some input data is not relevant and will set the parameters accordingly. If properly programmed to monitor the UHT process, the tool would disregard the origin and the transportation time.

SUMMARY

In one or more embodiments, the present invention may provide a computer-implemented method for obtaining parameters to be used by a control module of a computer, wherein the control module is adapted to control technical equipment by processing batch-run data from the technical equipment. The method may include: receiving, from technical equipment that has performed a production process, a reference plurality of multi-variate reference time series, wherein the multi-variate reference time series are based on time points of a batch-specific batch-run time interval and comprises data values from sources that are related to the technical equipment, wherein each multi-variate reference time series may include: a first time series from a first source, with data for first measurement values, a second time series from a second source, with data for second measurement values, and a third time series from a third source, with data describing particular manufacturing operations during the batch-specific batch-run time interval; splitting, for each multi-variate reference time series of the plurality separately, the batch-specific batch-run time interval into a plurality of phases, the phases being consecutive time intervals, by determining transitions between the particular manufacturing operations, and dividing the first time series into particular phase-specific first partial series and the second time series into particular phase-specific second partial series; processing, for each phase separately, and for the phase-specific partial series in combination, the phase-specific partial series to differentiate the plurality-related phase-specific time series into relevant partial time series or non-relevant partial time series according to relevance rules; and storing relevance information as the parameters.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
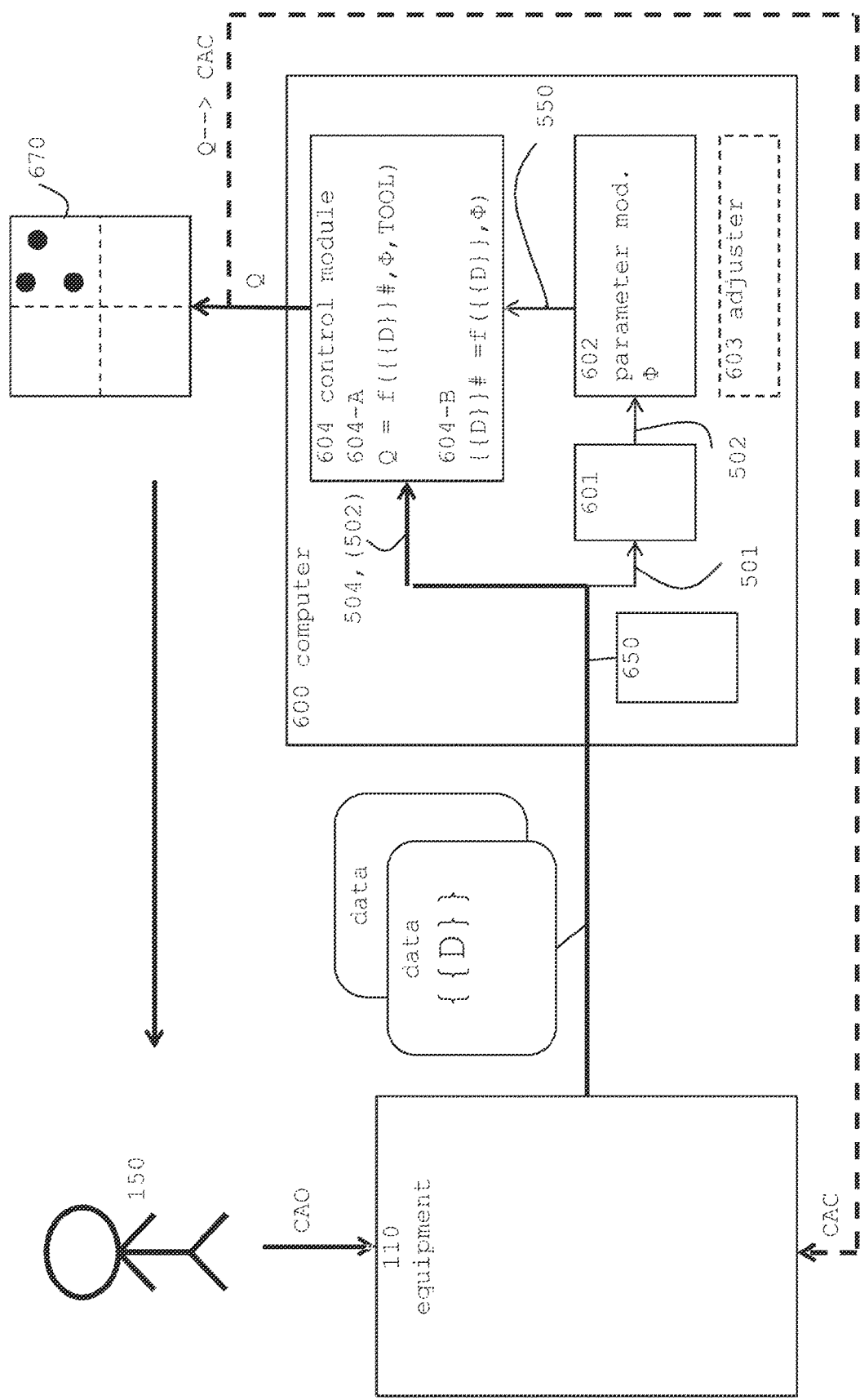
FIG. 1 illustrates an overview to a typical industrial use-case scenario with an operator, technical equipment and a computer.

For batches in industry, the human experts might not be able to properly obtain the appropriate parameters; the processes may be much more complex.

There are many tools available, such as Multi-way Principal Component Analysis (MPCA, occasionally: "multi-linear . . . "), Partial Least Square (PLS) techniques, t-Distributed Stochastic Neighbor Embedding (t-SNE), and others.

Before use, the tools would have to be programmed to receive one or more time series that are relevant, use appropriate parameters, provide the quality indicator in an appropriate format that is understood by the operator.

However, there are many constraints, such as the following: The number of time series at the input correlates to the processing time (of the tool), and potentially prevent the operator to obtain the indicator in due time. The parameters are specific to particular equipment and particular processes so that the accuracy of the quality indicator can drop significantly even for minor changes.

According to embodiments of the present invention, a control module is adapted to control technical equipment by processing batch-run data from technical equipment. The control module operates according to parameters that are obtained by a parameter module. The module receives a reference plurality of multi-variate reference time series with data values from sources that are related to the equipment. There are time series with measurement values and time series with data that describes particular manufacturing operations during a batch-run time interval. The module splits the time interval into phases by determining transitions between the particular manufacturing operations, and divides the time series into particular phase-specific partial series. For each phase separately, and for the phase-specific partial series in combination, the module differentiates phase-specific time series into relevant partial time series or non-relevant partial time series and set the parameters accordingly.

A parameter module of a computer executes a computer-implemented method for obtaining parameters. The parameters are to be used by a control module. The control module is adapted to control technical equipment by processing batch-run data from the technical equipment.

From technical equipment that has performed a production process the parameter module receives a reference plurality of multi-variate reference time series. Each multi-variate reference time series is based on time points of a batch-specific batch-run time interval and comprises data values from sources that are related to the technical equipment. Each multi-variate time series comprises a first time series from a first source, with data for first measurement values, a second time series from a second source, with data for second measurement values, and a third time series from a third source, with data describing particular manufacturing operations during the batch-run time interval.

For each multi-variate reference time series of the plurality separately, the parameters module splits the batch-run time interval into phases p. The phases are consecutive time intervals. The parameter module splits the time interval by determining transitions between the particular manufacturing operations. The parameter module divides the first time-series into particular phase-specific first partial series and divides the second time series into particular phase-specific second partial series. For each phase separately and for the phase-specific partial series in combination, the parameter module processes the phase-specific partial series and thereby differentiates the plurality-related phase-specific time series into relevant partial time series or non-relevant partial time series, according to relevance rules. The parameter module stores the relevance information as the parameters.

Optionally, the parameter module receives the multi-variate reference time series as pre-selected time series from a collection of multi-variate historic time series, with data from historic batch-runs.

Optionally, the parameter module receives the multi-variate reference time series for a plurality of multi-variate time series pre-selected from a collection of multi-variate time-series from historic batch-runs, with the criterion to select multi-variate time series from historic batch-runs that conform to a particular target quality indicator.

Optionally, the parameter module splits the time interval by determining the transition between the phases according to time-points of event descriptors that belong to the data of the third time series.

Optionally, the parameter module processes the phase-specific partial time series to differentiate relevance by evaluating any of the following rule that use: magnitude of data values within a pre-defined threshold band, the relation of data values to the standard deviation of the normal distribution, a signal to noise ratio (SNR) estimation (to disregard time series with relatively low SNR, measuring DTW distances, the identification of time-series that are correlated (or that are even identical) to consider of the time series as relevant, the identification of outliers in disturbed time series (considering a time series as non-relevant if the number of outliers exceeds a pre-defined threshold).

Optionally, the parameter module stores the relevance information by providing a parameter matrix. Optionally, the parameter matrix has binary elements that selectively allow or block the control module to process the batch-run data from the technical equipment.

Optionally, the parameter module fine-tunes the parameters. Thereby, the parameter module receives a plurality of further multi-variate time series, from batch-runs for that the quality indicators are already available. The parameter module provides a set of parameter variations of the parameter matrix by toggling parameters that allow to elements that block. For each parameter variation and for each further multi-variate time series, the parameter module obtains quality indicators by processing the multi-variate time series. The parameter determines differences of the obtained quality indicators and takes the variation for that the differences are minimal as selected parameters.

Optionally, the parameter module receives the multi-variate time series from batch-runs for that the quality indicators indicate the same quality.

A computer system is adapted to execute the method. A computer program product that—when loaded into a memory of a computer and being executed by at least one processor of the computer—performs the steps of the computer-implemented method.

Further, the parameters (obtained by executing the computer-implemented method) are used by a control module that aggregates data from a particular interaction-time batch-run of the technical equipment into a status indicator of the technical equipment. The control module uses the parameters to selectively filter out the data according to particular sources and particular phases prior to aggregation.

A computer-implemented method is a control method to identify a quality indicator for a particular batch-run (performed with technical equipment). The method comprises reading the parameters as a result of executing the method (to obtain the parameters), filtering data according to the parameters that are source-specific and that are phase-specific, and aggregating the data.

Time Ser1 Overview to Use-Case Scenario

FIG. 1 illustrates an overview to a typical industrial use-case scenario with operator 150, technical equipment 110 and computer 600 (or computer system). Computer 600 and/or (human) operator 150 interact with technical equipment 110. Interaction has the two interrelated aspects of monitoring (the status of the equipment) and controlling (changing the status of the equipment if needed). Computer 600 supports operator 150 in monitoring technical equipment 110 by processing data in real-time. Interaction to control the equipment is illustrated by the acronyms CAO and CAC, to be explained below.

Technical equipment 110 is a technical system that performs a production process (i.e. a pre-defined as sequence of operations) in batch-runs. (The operations can also be called "manufacturing operations" or "production operations").

In view of performance time, batch-runs can be interaction-time batch-runs (i.e., substantially simultaneous to the operator/equipment interaction and/or the computer/equipment interaction, i.e., "current batch-runs") and can be historic batch-runs (e.g. production process has already been finalized or cancelled).

Since interaction occurs simultaneously with the production process, the "interaction-time" is also the "production-time".

Technical equipment 110 provides data, in form of multi-variate time series {D} to computer 600. Data is differentiated into data that becomes available during interaction as interaction-time data 504 and data that has become available previously as historic data 501.

Computer 600 comprises reference modules 601, parameter modules 602 and 603 and control module 604 that execute step sequences of computer-implemented methods. Data repository module 650 is an auxiliary module implemented by computer memory and/or a database, known in the art. Data repository module 650 can be a physical part of computer 600. Or, module 650 can be accessible by computer 600. For simplicity, FIG. 1 illustrates the modules as part of a single computer, but the module functions can be distributed to different physical computers. It is not required that all modules are present, parameter module 603 is optional.

Parameter modules 602 and 603 perform calculations that involve multi-dimensional data. Therefore the calculations can be computation-intensive. But modules 602 and 603 do not have to execute methods 402 and 403 all of the time. For example, the execution of these methods is not required during interaction. Parameter modules 602 and 603 are therefore candidates for execution on a remote platform, by a remote computer provider (usually known as "cloud").

Figure 2:
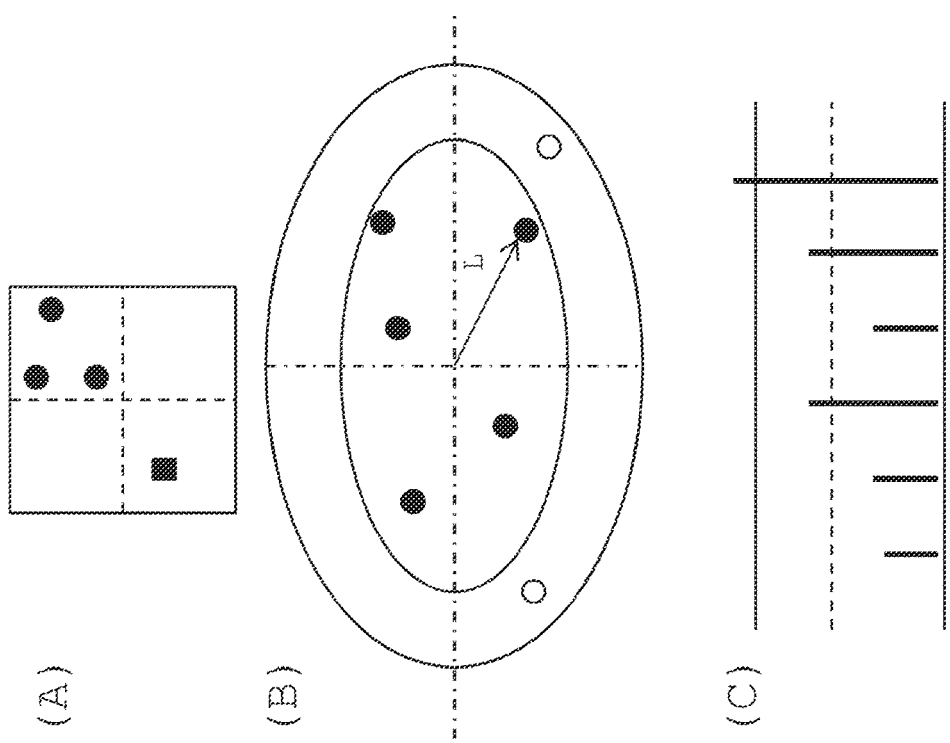
FIG. 2 illustrates data visualization by way of example.

It is convenient to look at FIG. 1 together with FIG. 2 that illustrates a flowchart for computer-implemented method 400, with step sequences 401, 402, 403 and 404, performed by modules 601, 602, 603 and 604, respectively. For convenience, the explanation starts with control module 604 that performs the last step sequence 404 during the batch-run.

As illustrated by bold arrows, technical equipment 110 provides interaction-time data 504 to control module 604. Data 504 comprises at least one multi-variate time series {D} from the interaction-time batch-run (i.e. from the batch-run currently being performed by equipment 110). Control module 604 provides quality indicator Q of the interaction batch-run, as in step sequence 404.

There is a requirement that indicator Q corresponds to the interaction-time batch-run with an acceptable accuracy. Accuracy can be measured by investigating indicators from multiple method performances, or otherwise. For acceptable accuracy, the ratio between correctly identified indicators (by computer 600) and in-correctly identified indicators would be above a pre-defined threshold.

Optionally, control module 604 provides quality indicator Q in form of visualization 670.

Control module 604 can be differentiated into the sub-modules filter 604-A and aggregator 604-B. The function ("f") of control module 604 can be described as Q=f ({{D}}, Φ, TOOL).

Using the differentiation, a sub-function of filter 604-A can be described as {{D}}#=function ({{D}}, Φ); and a sub-function of aggregator 604-B can be described as Q=f ({{D}}#, TOOL).

Figure 4:
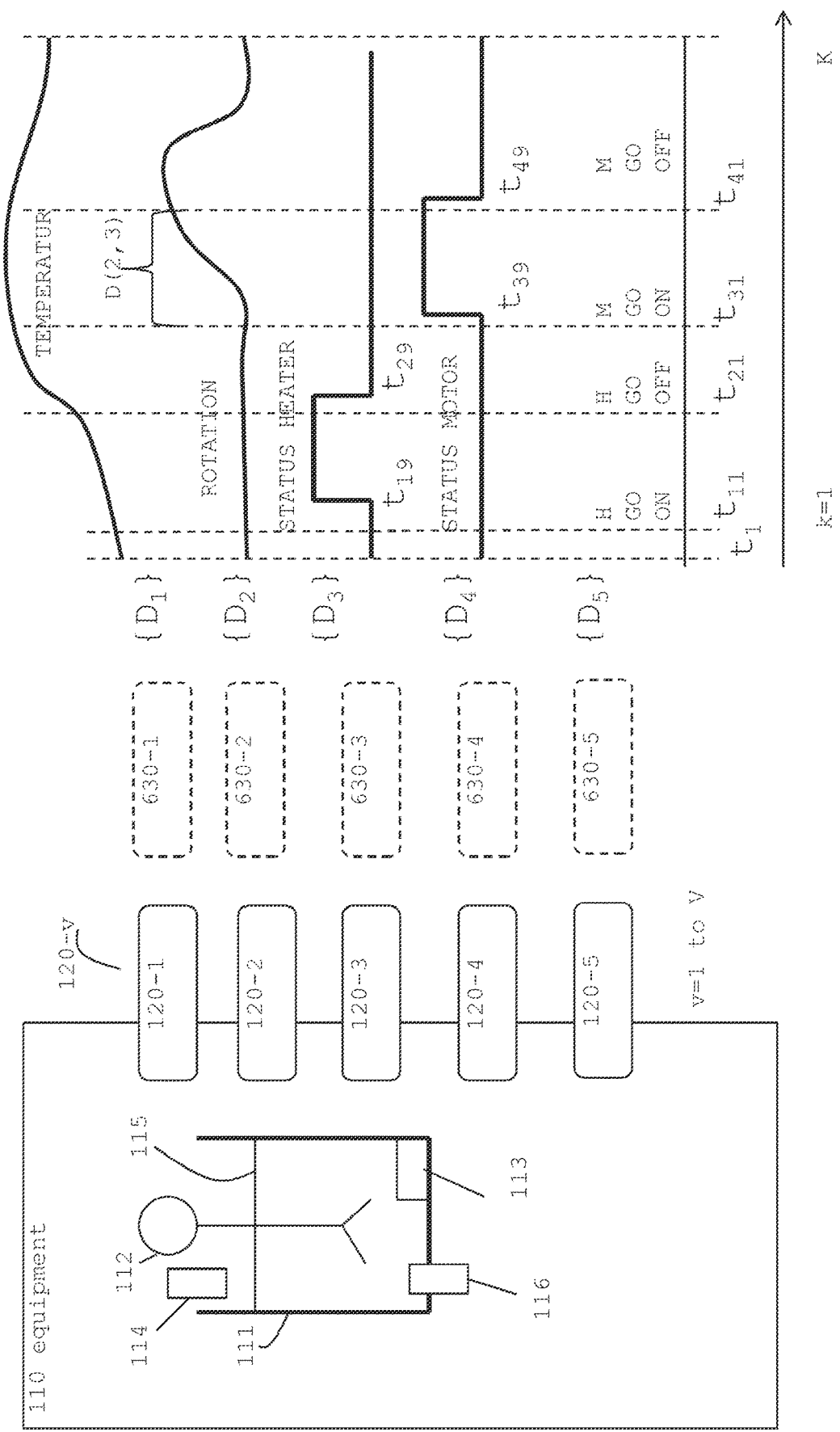
FIG. 4 illustrates technical equipment that performs a production process, and that provides interaction-time data and/or historic data to the computer.

As input for control module 604, {{D}} stands for data 504 being a multi-variate time series from a particular interaction-time batch-run. {{D}} is multi-variate because technical equipment 110 has multiple sources (or "variates", index v=1 to V, cf. FIG. 4). (It is noted that module 604 can also process historic data 501).

As output from control module 604, Q stands for the mentioned quality indicator.

Implemented by aggregator 604-B, TOOL stands for a pre-defined algorithm to calculate Q. For example, the algorithm is MPCA and aggregator 604-B is implemented with MPCA libraries. Other tools (such as PLS tools as mentioned) can be used as well. In operation, aggregator 604-B provides quality indicator Q as an aggregation of data {{D}}. Aggregator 604-B does not use {{D}} completely, but uses data that has been pre-processed by filtering according to parameters 550.

Implemented by filter 604-A, {{D}}# and Φ stand for parameter-based filtering. Filter 604-A receives {{D}} as input and provides {{D}}# as output (i.e. intermediate result). Parameters 550 indicate to what extend {{D}} is used and thereby indicate the filter function {{D}}#=f ({{D}}, Φ). Filtering is specific to data D(v, p) from particular sources v within {{D}} and specific to data from particular phases p within {{D}}.

For convenience of explanation, parameters 550 are explained as binary parameters. A particular binary parameter is applied to particular data D(v, p) to either pass or block data. In the following, "pass" is symbolized by "1" (or by the term "relevant", "allow") and "block" is symbolized by "0" (or by the term "non-relevant").

As used herein, Φ—uppercase Greek Phi—stands for a matrix as a form to implement parameters 550. Parameter matrix Φ has rows relating to particular sources v and columns relating to particular phases p, with 0 and 1 being possible values for the matrix elements. In other words, parameter matrix Φ indicates—at the granularity of source v and phase p—what data to be processed (passing to aggregator 604-B) and what data to disregard (by blocking). (For Φ with all elements being 1: {{D}}#={{D}}.)

Parameters 550 can be implemented otherwise (e.g., by matrices with different row/column notations, by tables in a data-base). There is no need to implement parameters 550 as binary parameters.

Since aggregators are known in the art, the description will generally focus on filtering and more in particular focus in obtaining parameters 550. Parameter obtaining can be a very complex task. Some of the sources provide data that is not relevant to identify a particular quality indicator, so that data has to be filtered out ("block" parameters). Some other sources are relevant and need to be considered by "pass" parameters. Semantics can't be considered in all cases. But before explaining the details, the description looks at quality indicator Q. Q can be processed through visualization 670 (to operator 150, cf. FIG. 2) and/or through conversion to a control signal.

As used herein, a "user" is the person who interacts with the computer. Operator 150 becomes the user of computer 600 at various occasions, for example when he or she uses quality indicator Q from computer 600. Q contains information about the internal state (of technical equipment 110) and therefore enables operator 150 to cause corrective actions. Causing the corrective action is symbolized by an arrow. It is labelled by the acronym CAO (corrective action by operator).

In other words, operator 150 can watch visualization 670 and can adapt the interaction with technical equipment 110 if needed. The counter-clockwise arrangement of the arrows can be regarded as a control loop.

In the example, visualization 670 is illustrated as a two-dimensional diagram. Data 501/504 ({{D}} from technical equipment 110) can be visualized in its aggregated form by dots or otherwise. A dot can stand for a combination of multiple data values. By convention, dots appearing clustered in the right upper quadrant of the diagram may indicate that batches are running normally. Dots in a different quadrant (or moving after re-visualization) may indicate that the corresponding batch is experiencing a deviation from normal operation (cf. FIG. 8). In other words, control module 604 provides online monitoring (of the production process). The attribute "online" stands for a constraint: the processing time (to process data {{D}} to quality indicator Q) must be short enough for technical equipment 110 (and/or operator 150) to perform corrective actions. In other words, the online constraint is a technical real-time requirement.

Involving operator 150 is convenient, but not required. In addition or alternatively to CAO, computer 600 can forward quality indicator Q to technical equipment 100. This approach is illustrated by dashed line 690. The person of skill in the art understands that Q would have to be processed to a control command CAC (corrective action by computer). Computer 600 may send CAC to technical equipment 110 directly. In other words, visualization 670 and operator 150 could be by-passed.

Control module 604 performs step sequence 404 by using parameters 550. As mentioned, parameters 550 are specific to sources v and to phases p, and parameters 550 can be implemented by matrix Φ. A large part of the description will explain how parameters 550 can be obtained by processing data {{D}} from historic performances of the production process. The description will explain the phase-specific property of parameters 550 by contrasting phase non-specific parameters 540 (in FIG. 8) to phase-specific parameters (in FIG. 9).

As parameters 550 are obtained from processing historic data, there are step sequences (i.e. methods) performed in advance, as explained in connection with FIG. 3. The description will then refer back to FIG. 1 and explain the thin-line arrows shown below control module 604. But it is still convenient to take a short excurse to visualization 670.

2 Visualizations

FIG. 2 illustrates data visualization by way of examples (A), (B) and (C). Usually, computer 600 (with module 604) provides visualization on a screen, but other user-interfaces can also be used (e.g., printing on paper). Data for particular batch-runs is visualized by diagram elements (such as dots or vertical lines) that are located within coordinate systems. The element locations can be indicative of particular aggregated values. The elements can be enhanced by further information, through shape (e.g., round dots vs. square dots), color coding (e.g., to differentiate batch-run categories), or the like. It is also possible to add batch identification (cf. (C) for batch-runs 1 to 6).

Particular graphical frames, in the figure (quadrants, circles, horizontal lines) can optionally support the visualization. The frames can indicate borders that are associated with quality indicators.

Example (A) illustrates dots located in one the four quadrants of a square; dots stand for reference batch-runs (historic batch-runs with particular quality, cf. FIG. 7) and a small square stands for a production batch-run (i.e. a batch that is currently being processed, interaction-time). In the example, the user can see (here from the allocation to different quadrants) that the production batch-run has a different quality than the reference batch-runs.

Example (B) is similar to a shooting target with concentric circles (or ellipsis): dots within an inner circle stand for batch-runs of a particular quality (such as "highest category"); and dots within an outer circle stand for batch-runs with lower quality.

Example (C) symbolizes data in vertical lines, with lines below pre-defined confidence levels. The levels are given as horizontal lines that are dashed (confidence limit 95%) and plain (confidence limit 99%). Batch-runs with ID-numbers 1, 2 and 4 are below the lower limit, batch-runs 3 and 5 are between the lower and the higher limits, and batch-run 6 is above the higher limit.

It does not matter how a particular visualization looks like, the appearance is selected more or less arbitrarily. Operator 150 (being the user) can compare a particular batch-run (i.e., that of the production) with references.

Potentially, operator 150 can also watch the elements for a particular batch moving. An element (e.g., a dot) moving to the right upper quadrant (A) or to the center (B) can indicate a change towards a particular reference (e.g., an ideal case in the center).

For the examples of FIG. 2, computer 600 calculates the locations (of the dots or other elements) according to pre-defined calculation rules (or models). Visualization can also be used to fine-tune the calculation rules (especially by fine-tuning parameters). An example will be given in connection with FIG. 12.

It is again noted that visualization is convenient but not required. A user—such as operator 150—can easily see if a particular batch-run has a particular aggregated indicator that is similar to an indicator of a reference batch-run (e.g., (2) the white circle vs. the black circles) or not, and can easily estimate weather the particular indicator is related to a particular quality indicator (or not). Corrective actions can be identified from the reference. But the evaluation can be performed by the computer. The computer can even use location data. This is illustrated for a particular batch-run in (2) for that the location has a distance L (arrow length) to the coordinate origin.

To summarize some points from this excurse: visualizing (and therefore control equipment in general) is related to topics like the selection of parameters 550, the identification of references and so on.

3 Method Overview

Figure 3:
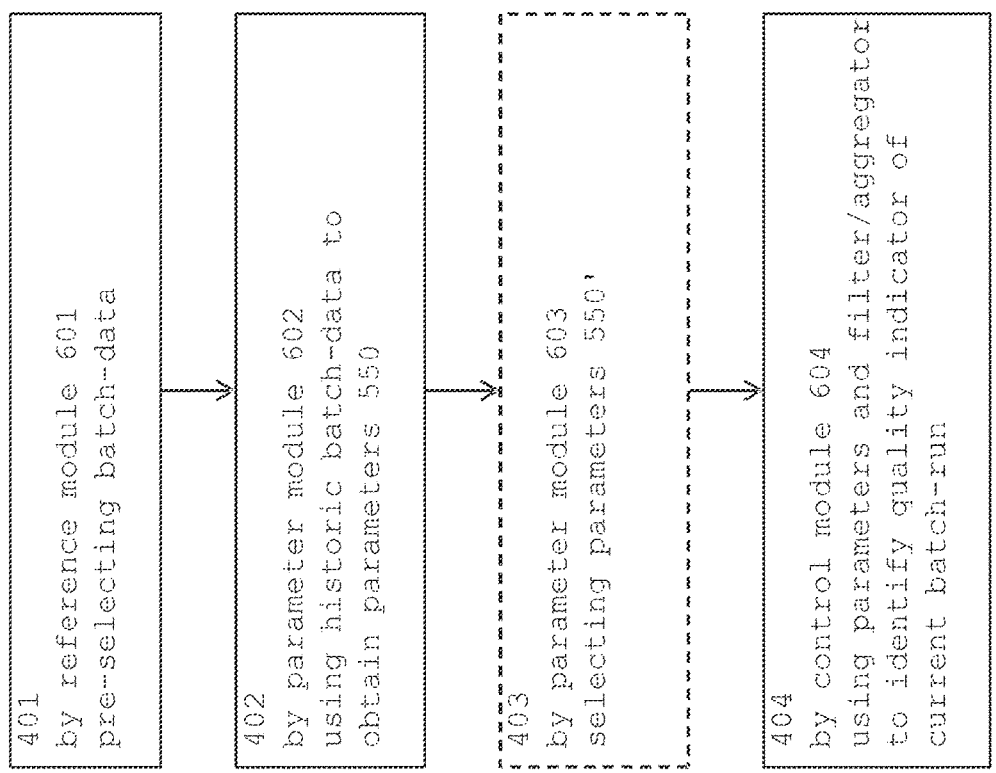
FIG. 3 illustrates a flowchart for a computer-implemented method.

FIG. 3 illustrates a flowchart for computer-implemented method 400, with step sequences 401, 402 and 404. The step sequences can be considered as computer-implemented methods as well. The description refers back to FIG. 1.

Reference method 401 is a method to identify reference plurality 502 (of multivariate time series) by initially selecting reference batch-runs from collection 501 of historic batch-runs 501.

Parameter obtaining method 402 is a method for obtaining parameters 550 (by training) for control module 604 applied for comparing batch-runs of a production process. Details for method 402 will be explained in connection with FIGS. 10-11.

Parameter adjustment method 403 is an optionally performed method (dashed box) for selecting parameters 550' (from parameters 550) to increase the accuracy. In that sense, parameters 550/550' are provided by method 402/403. Method 403 can be considered as a continuation of method 402.

Control method 404 is a method to identify a quality indicator Q for a particular batch-run, using (source-specific and phase-specific) parameters 550. Method 404 is thereby also a method to control a production process that is performed by technical equipment 110. In executing method 404, control module 604 can obtain the quality indicator as a sequence of phase specific quality indicators Qp. It is also possible to derive quality indicator Q (cf. FIG. 1) for the complete batch-run.

In view of the timing, methods 401, 402 and 403 are "offline" methods to be executed at different times, with historic data as input, and method 404 is an "online" method that is performed substantially simultaneously with the interaction batch-run. There are links in the appropriate selection of parameters.

FIG. 3 (and FIG. 12) also illustrates one or more computer programs or computer program products. The computer program products—when loaded into a memory of a computer and being executed by at least one processor of the computer—perform the steps of the computer-implemented method. So in other words, the blocks in the flowchart illustrate that the method can be implemented by modules under the control of the program. The person of skill in art can choose an appropriate assignment of methods to computer modules, so that assignments 401/601, 402/602, 403/603 and 404/604 are just convenient examples for illustration.

4 Technical Equipment

FIG. 4 illustrates technical equipment 110 (left side) that performs the production process (i.e., "batch-run") and that provides interaction-time data 504 and/or historic data 501 to computer 600 (cf. FIG. 1). Data can go into data repository 650 (cf. FIG. 1), for use as historic data 501 if needed. Differentiating data into 501/504 is not important at this point so that the description uses {{D}}.

By way of example, technical equipment 110 is illustrated as comprising tank 111 with motor/mixer 112 that stirs liquid 115, with heater 113 that heats up liquid 115, and with valves 114/116 that allow adding (or removing) liquid 115. As mentioned, the production process is pre-defined as sequence of operations. In the example, the operations are adding material, heating, waiting, stirring, and others. Corrective actions (cf. CAO, CAC of FIG. 1 as part of the interaction) can modify the activities (e.g., stop heating, see the discussion below).

By performing the batch-run, data 504 becomes available as time series {{D}} (i.e., series of data values indexed in time order for subsequent time points $t_k$, $t_{k+1}$). A multi-variate time series {{D}} is a set of uni-variate time series {$D_v$} with a common time-base [$t_1$, $t_K$]. {$D_v$} can also be called "process variable". The property "multi-variate" symbolized by "double curly bracket {{ }} and the property "uni" by single curly brackets { }. A uni-variate time series can also be regarded as "signal".

For convenience, FIG. 4 illustrates data values are graphs (or "trajectories") with [0,1] values at the ordinate and the time [t1, tK] at the abscissa.

While time points are symbolized by "tk" with time-point index k, time intervals are given as closed intervals by square brackets as in [t1, tK]. Limit points t1, tK belong to the interval. For simplicity of illustration there is the convention that time intervals are contiguous (i.e., no time point left). Unless stated otherwise, the duration between consecutive time points ("time slot") is equal: $\Delta t = tk+1-tk$.

In general, K is the overall number of time-points during a particular process batch-run. The batch-run has a temporal length (i.e. duration) of the interval [t1, tK]. Assuming that data is not yet collected before t1 and no longer collected after tK, the batch-run duration can be calculated as tK−t1. The duration can be batch-run specific.

Time intervals [t1, tK] can be divided into phases (or "segments"), identified by phase index p. Uppercase P stands for the number of phases in a particular batch-run interval [t1, tK]. Uppercase Np stands for the number of time points in a particular phase p, and Np can be different from phase to phase (i.e. phase-specific). The division into phases becomes relevant for step sequences 402 and 404 to increase accuracy.

For convenience, consecutive phases p1 and p2 (in general p and p+1) can be defined by [t11, tN1] and [t12, tN2]. Time points tnp can be identified by double-indices np. The index n counts the time points within the phase p. The last time point tN1 of phase 1 in the first phase is the predecessor of the first time point t12 of the second phase.

There is no need to distribute all time points of [t1, tK] to particular phases. The overall number of time point in the phases (the sum of Np from p=1 to P) can be smaller than (or equal to) to K.

Technical equipment 110 is also illustrated with a number of data sources 120-$v$, with variate index v from v=1 to v=V, collectively data sources 120. The number V of data-sources corresponds to the "multi-variate", and data source 120-$v$ provides uni-variate time series {Dv}. The single-digit number V=5 (120-1 to 120-5, "5-variate") is a convenient simplification, but for real equipment, V=100 or higher would be possible.

For technical equipment 110 being industrial equipment, data becomes available from different types of sources 120, among them: sources that provide measurement values (e.g., rotation speed of the motor, temperature of the liquid, amount of liquid, data from a laboratory and so on), sources that provide control instructions (e.g., to open a valve to add liquid, to close the valve etc., to start or stop the motor or the heater), or sources that provide status indicators (e.g., a particular valve being open, or being closed).

Data sources 120 are related to technical equipment 110: The data sources can be part of the equipment, or the data sources correspond to data that flows to or from the equipment. FIG. 1 symbolizes the relation by illustrating the sources with rectangles that partly overlap the rectangle of the equipment. Data sources 120 can be implemented differently. For example, measurement values and status indicators do usually come from sensors. Or, the control instructions can come from a controller computer (not illustrated) that controls the operation of technical equipment 110. There is no need that data sources 120 are physically connected to technical equipment 110.

Pre-processing data modules 630 are optionally switched between data-sources 120-$v$ and repository 650. Pre-processing data modules 630 normalize data. The description refers to normalizing by way of example:

Different data sources 120 may provide data at different points in time. For example, sensors may use different sampling rates (e.g., sensing the temperature every minute vs. sensing the rotation every second). Or, status indicators may become available when a particular event has occurred (that changes the status, e.g., the valve from status "closed" to status "open").

Persons of skill in the art can use interpolation/extrapolation techniques to normalized time to common $\Delta t$ (as a consequence common K as well, common abscissa). Persons of skill in the art can normalize the values as well (common ordinate). In the example, data values can be normalized to numeric values between 0 as the minimal value and 1 as the maximal value. Normalizing removes measurement units and other information that can be associated with the data. Normalizing can use min/max values (with units). For example, for a motor with the maximal rotational speed 60 cycles per minute, the normalized extremes are 1 for maximal rotation and 0 for stand-still. Status data can be normalized, for example, with a value 0 for "valve closed" and a value 1 for "valve open". Data values can have a negative sign as well, but in this example this is not illustrated.

As it will be explained, parameter obtaining method 402 (and control method 404) comprises steps that split the time interval [t1, tK] into phases p and that divide time series into phase-specific partial series. By way of example, {D2} comprises partial series D(2, 3), with index 2 standing for the source, and index 3 standing for the phase. Depending on parameters 550 (the parameter for (2, 3) to be more exact), aggregator 604-B of control module 604 will process D(2, 3) or not.

5 Data Example

Although particular semantics of the data are not important for the processing steps (of methods 401-404), it is useful to discuss some of them for FIG. 4.

Uni-variate time series indicate temperature of liquid 115 in {D1}, rotation of motor 112 in {D2}, the binary status of heater 113 in {D3} (ON or OFF), the binary status of motor 112 in {D4} (ON or OFF), and the arrival of control instructions in {D5} (from the operator, or from a control system). In the following, time points are discussed in consecutive order (with single-indices or double-indices). As used herein, the arrival of an instruction starts a new phase. Occasionally, the index n is set to 8 or 9. The assumption of a "8*Δt" time interval between tp1 to tp9 is just selected by way of example (to avoid double-digit indices).

Time point t1 stands for the start of a particular batch-run. It is assumed that the sensors provide data for temperature {D1} and rotation {D2}, as well as status data {D3}, {D4}. A phase is not yet defined.

Data in {D5} at time point t11 indicates the arrival of an instruction to switch on the heater. This marks the start of phase 1. Data in {D3} at t19 documents that the status has been changed accordingly (OFF at t18 and ON at t19).

Data in {D5} at time point t21 indicates the arrival of an instruction to switch off the heater, starting phase 2, and data in {D3} at time point t29 documents the status change accordingly (OFF at t29).

Data in {D5} at time point t31 indicates the arrival of an instruction to switch on the motor, starting phase 3, and data in {D4} at t39 documents the status change.

Data in {D5} at time point t41 indicates the arrival of an instruction to switch off the motor, starting phase 4, and data in {D4} at t49 documents the status change.

The arrival of instructions is a particular embodiment for the presence of event descriptors in the time series (here in {D5}. Looking at the {D1} and {D2}, the measurement values follow the status changes. Operations can be differentiated otherwise. Although the example uses V=5 time series, it is noted that for real technical equipment the number is higher. The operator would potentially not be able to determine the quality (i.e., within a real-time situation that allows the application of corrective actions while the batch-run is ongoing).

Although these semantics are not relevant for the performance of the step sequences (cf. FIG. 9), it is convenient to regard batch-runs as in FIG. 3 to have quality indicator Q="success", there is no need to apply corrective actions (CAO, CAC).

5 State Transitions

Figure 5:
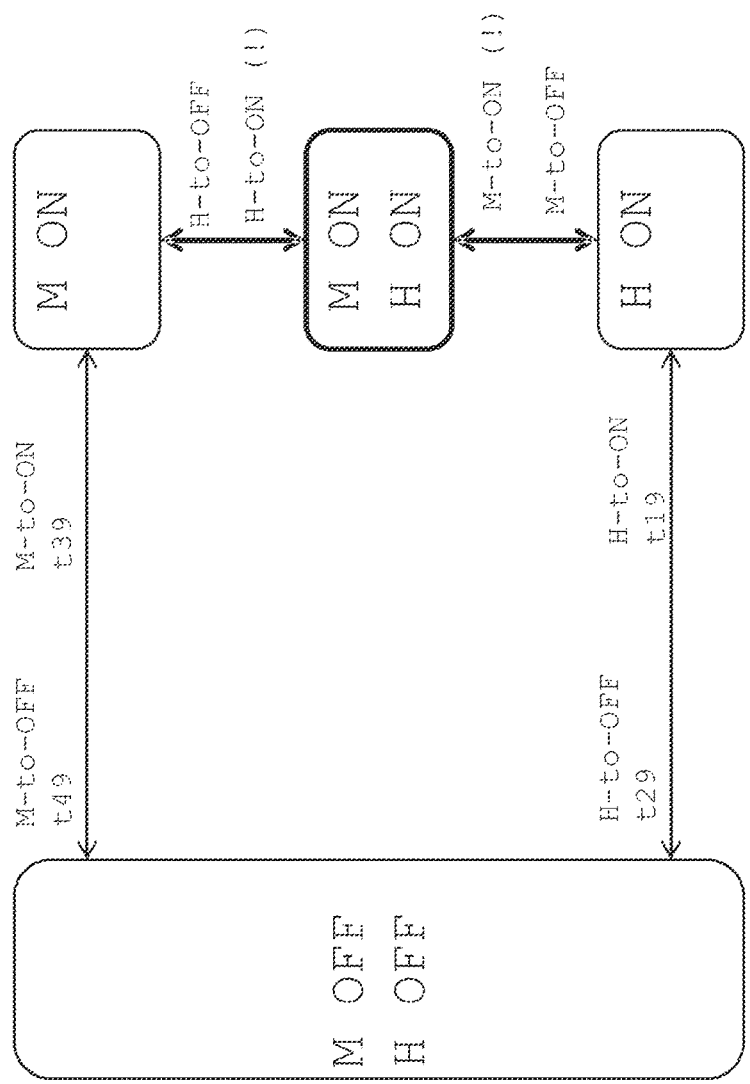
FIG. 5 illustrates a state diagram for the operation of the technical equipment.

FIG. 5 illustrates a state diagram for the operation of technical equipment 110. Corresponding to the status data in {D3} and {D4} of FIG. 1, with the two components heater (H) and motor (M) and the binary distinction into ON and OFF there are 4 possible states and 8 possible state transitions.

Some state transitions have already been explained for FIG. 4: H-to-ON at $t_{19}$, H-to-OFF at $t_{29}$, M-to-ON at $t_{39}$ and M-to-OFF at $t_{49}$. These state transitions correspond to the pre-defined sequence of operations of the production process, and for transitions in that order (and for other measurement values within pre-defined min/max ranges), the batch-run should have Q="success".

There are further transitions, from M ON or H ON leading to the state (M ON, H ON), and leaving that state. Assuming (i) that the state (M ON, H ON) can lead to "failure", and (ii) that the state transitions away from (M ON, H ON) are considered as corrective actions. This view is simplified; technical equipment 110 can tolerate (M ON, H ON) for a certain number of time points.

In scenarios with a relatively large number of variates, the assumptions are difficult to obtain, due to the above-mentioned complexity. Also, it can't be expected that these semantics are considered (by modules 602, 603, 604).

In the following, the description explains how the data {{D}} is to be processed by parameters 550 so that (M ON, H ON) is communicated to the operator and identified as a potential failure condition (that can be corrected).

As the selection of parameters 540/550 (cf. FIG. 1) is important as input to control module 604, the description focuses on parameter module 602 (that provides parameters 550).

6 Separate Mode and Combine Mode Data Processing

Figure 6:
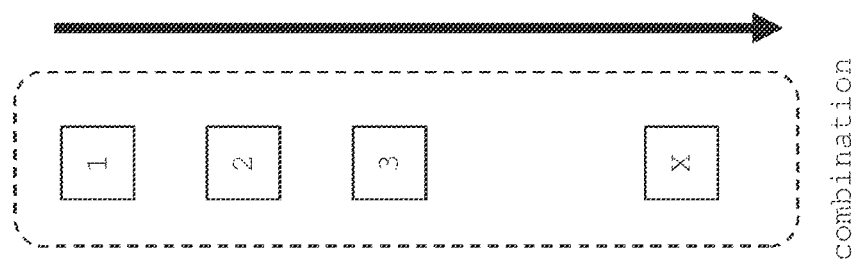
FIG. 6 illustrates a plurality of data objects, identified by indices in two processing modes.
Figure 6:
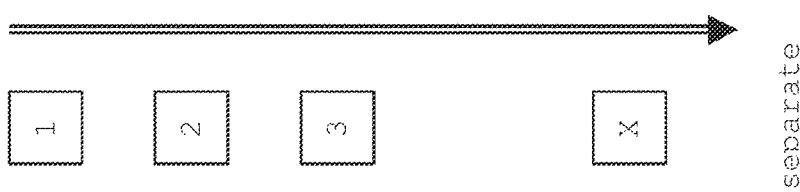

FIG. 6 illustrates a plurality (or "set", or "collection") of data objects, identified by indices x=1 to X in two processing approaches (or processing modes):

separate mode (left, double-line-arrow) and
combine mode (right, single-line-arrow).

A data object (index x here in general) can be, for example:

a particular multi-variate time series {{D}}, with index h or with index e from a collection/plurality of a multi-variate time series, a particular uni-variate time series {$D_v$} (index v) that belong to {{D}} the time-points [$t_1$, $t_{Np}$] for a particular phase, with(p), a phase-specific (uni-variate) time series, i.e. partial series, such as D(v, p), a phase-specific quality indicator $Q_p$.

As on the left side, computer 600 (i.e., a module inside the computer) processes object 1, object 2 etc. until object X independently from each other. Examples include the determination of relevance. Separate processing can be executed by serial processing (in repetitions for 1 to X, in any order such as in a loop from 1 to X, or from x to 1, or otherwise),
by parallel processing (such as by sub-modules), or
by hybrid implementations (serial/parallel).

As on the right side, computer 600 processes object 1, object 2 etc. until object X in combination with each other. Data for object 1 is processed with data from other objects etc. Examples include the determination of average or medium values.

The different arrow types are repeated in other figures below.

The description uses the term "each" to describe actions in application to the X data objects. Thereby, the description assumed ideal situations. Since data processing is frequently applied to data from batch-runs that have been performed in reality, some of the data objects might not be available. Nevertheless, the actions can be performed as described. For example, for some of the multi-variate time series, a particular time series from a particular source might be missing, and the computer can perform its computations just on the available data.

7 Selecting Data

Figure 7:
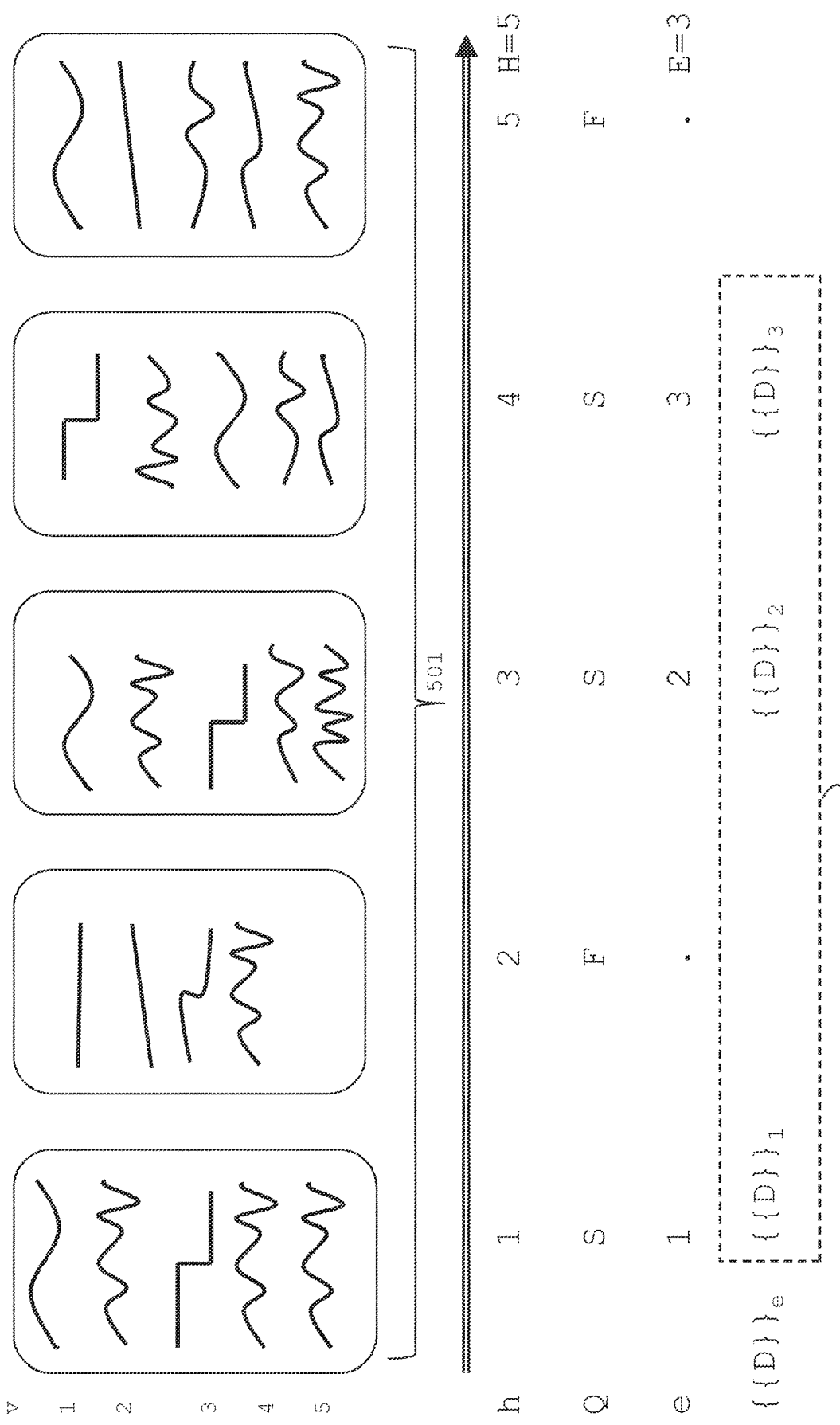
FIG. 7 illustrates a collection of multi-variate historic time series.

FIG. 7 illustrates collection 501 of multi-variate historic time series. These time series result from historic batch-runs. Collection 501 can be available, for example, in data repository 650 (cf. FIG. 1). The figure is convenient to explain steps of step sequence 401 (executed by reference module 601).

The historic time series are illustrated by symbolic trajectories (with V=5 variates, as in FIG. 4). Uppercase H stands for number of historic batch-runs for that data is available in collection 501. The figure illustrates H=5. The number is much simplified: technical equipment 110 performing batch-runs with a duration of 60 minute in average collects (multi-variate) historic time series $\{\{D\}\}$ in the order of magnitude H=8.000 per year. Historic index h identifies the particular batch-run.

In a first pre-processing step, reference module 601 divides collection 501 according to a quality indicator (of the historic batch-runs), in the example into S like "success" or F like "failure". At this granularity, quality indicators are usually available in repository 650.

Assuming that reference module 601 should provide parameters 550 to recognize batch-runs that lead to "S", reference module 601 executes the second step for the next selection for the successful batch-runs, here for h=1, h=3 and h=4. The overall share of S (here 60%) must not correspond to reality, the example is just simplified. For the selected batch-runs, the reference module 601 changes the index to e=1 to E. As used herein, index "e" is the batch-run index to identify batch-runs to be used for obtaining the parameters (in method 402), with E being the number of batch-runs (for that purpose).

The double-line-arrow illustrates that the steps are executed in the separate mode.

As a consequence, Ke is the overall number of time-points during a particular process batch-run. With Δt being the same for all, the duration Te of the process batch-run is different. As illustrated, batch-run e=1 took the longest time, batch-run e=2 took the shortest time. This is not only an observation but a feature to note: the number of time-points is not relevant, especially not for splitting time intervals into phases (cf. FIG. 10).

As a result of step sequence 401, reference module 601 provides reference plurality 502 with multi-variate reference time series. Reference plurality 502 comprises reference data from $\{\{D\}\}_1$ to $\{\{D\}\}_E$ from historic batch-runs (collection 501) with (substantially) equal quality indicator Q. Processing of plurality 502 by parameter module 602 will be explained with more detail in FIG. 8. Reference index e=1 to E for the notation $\{\{D\}\}_e$ is mentioned already here (a step in method 402 compares—in combine mode-particular partial series with each other).

Reference plurality 502 can be used for—at least—two purposes.

Figure 8:
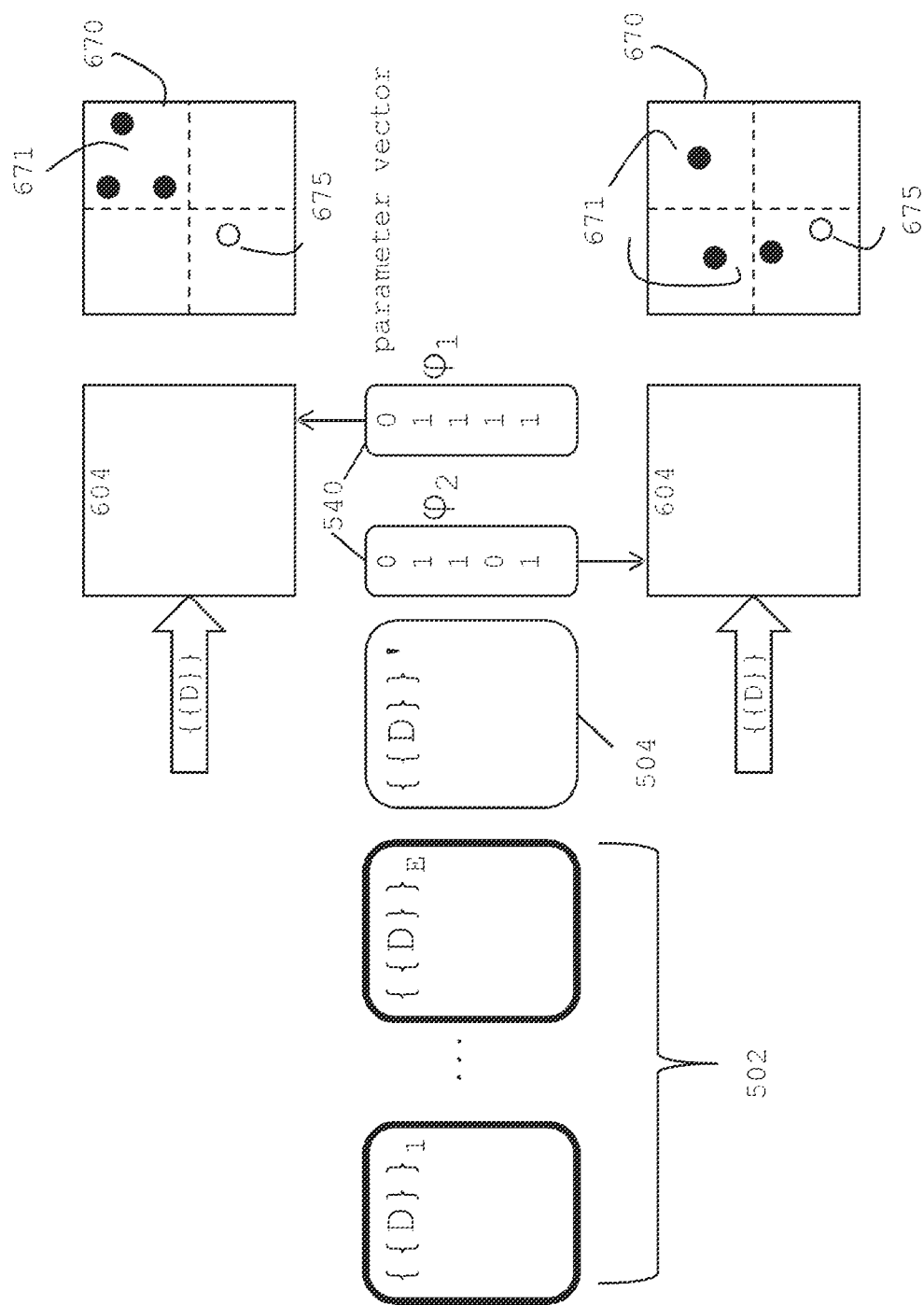
FIG. 8 illustrates a control module and a selection of parameters.
Figure 9:
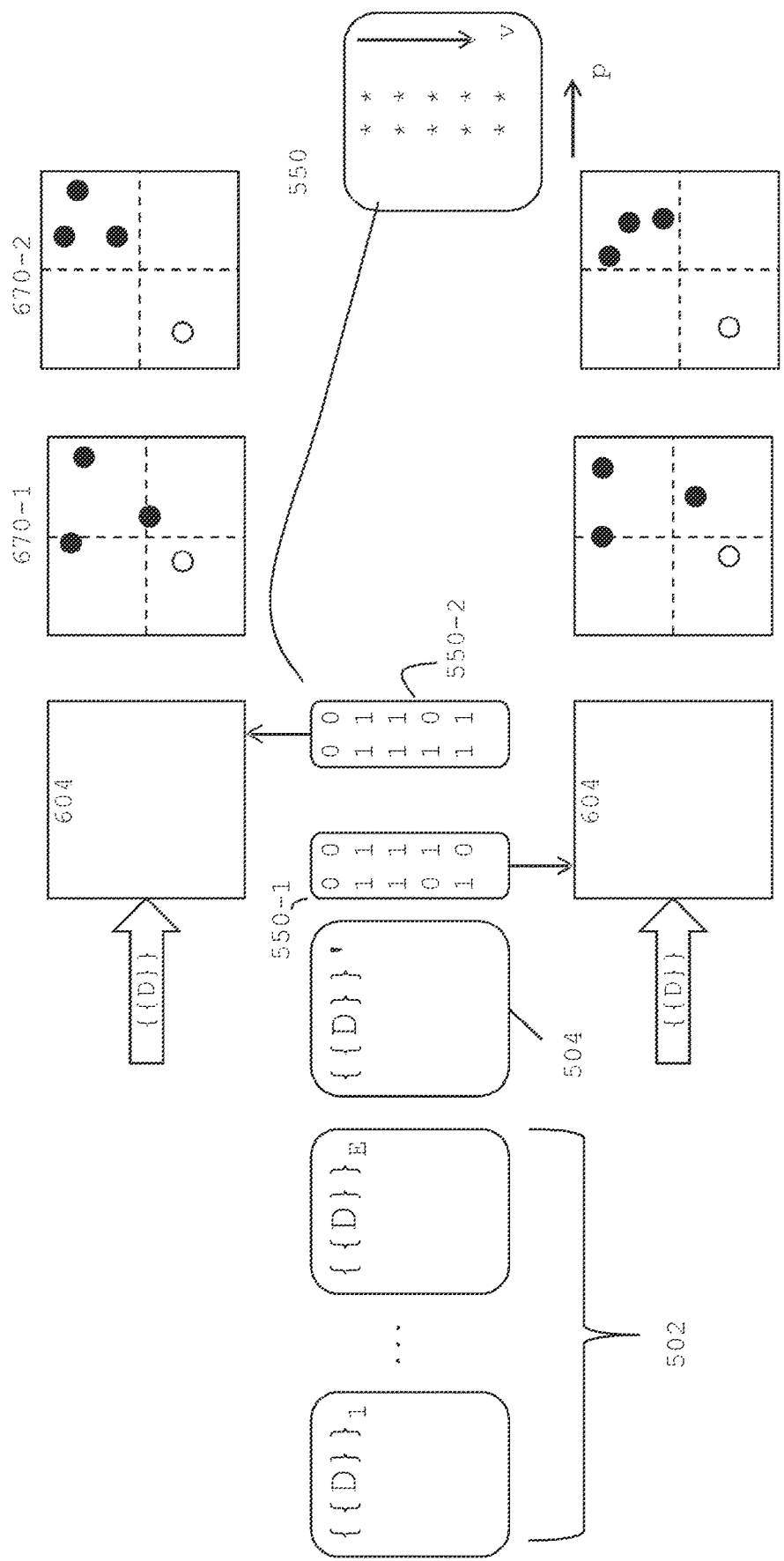
FIG. 9 illustrates a control module and parameters that are phase-specific, and thereby shows an improved approach.

For a first purpose—details to be explained with FIGS. 8-9—control module 604 compares reference data 502 with historic data 501 (to identify the quality indicator for the interaction-time batch-run).

Figure 10:
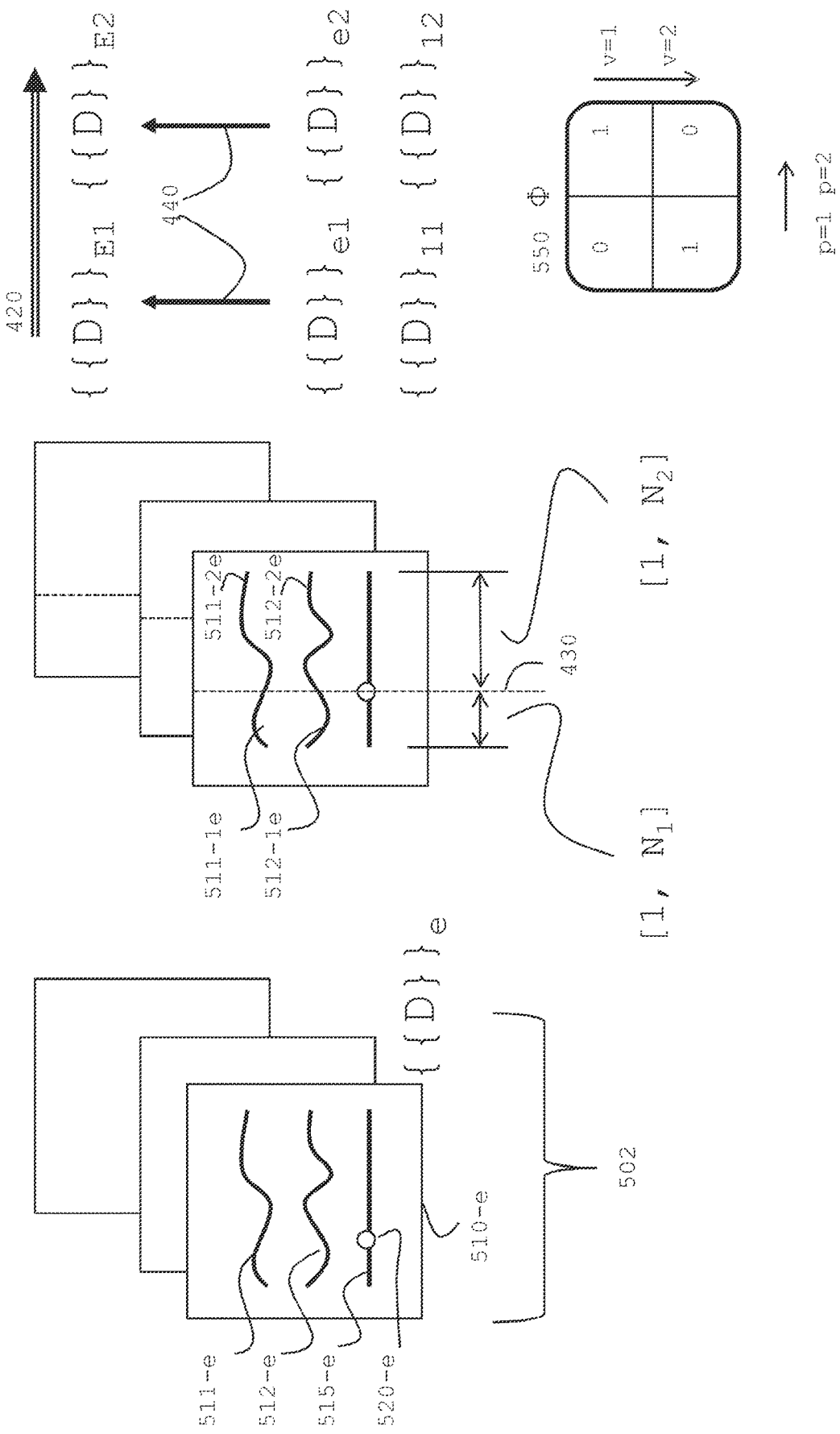
FIG. 10 illustrates a reference plurality.
Figure 11:
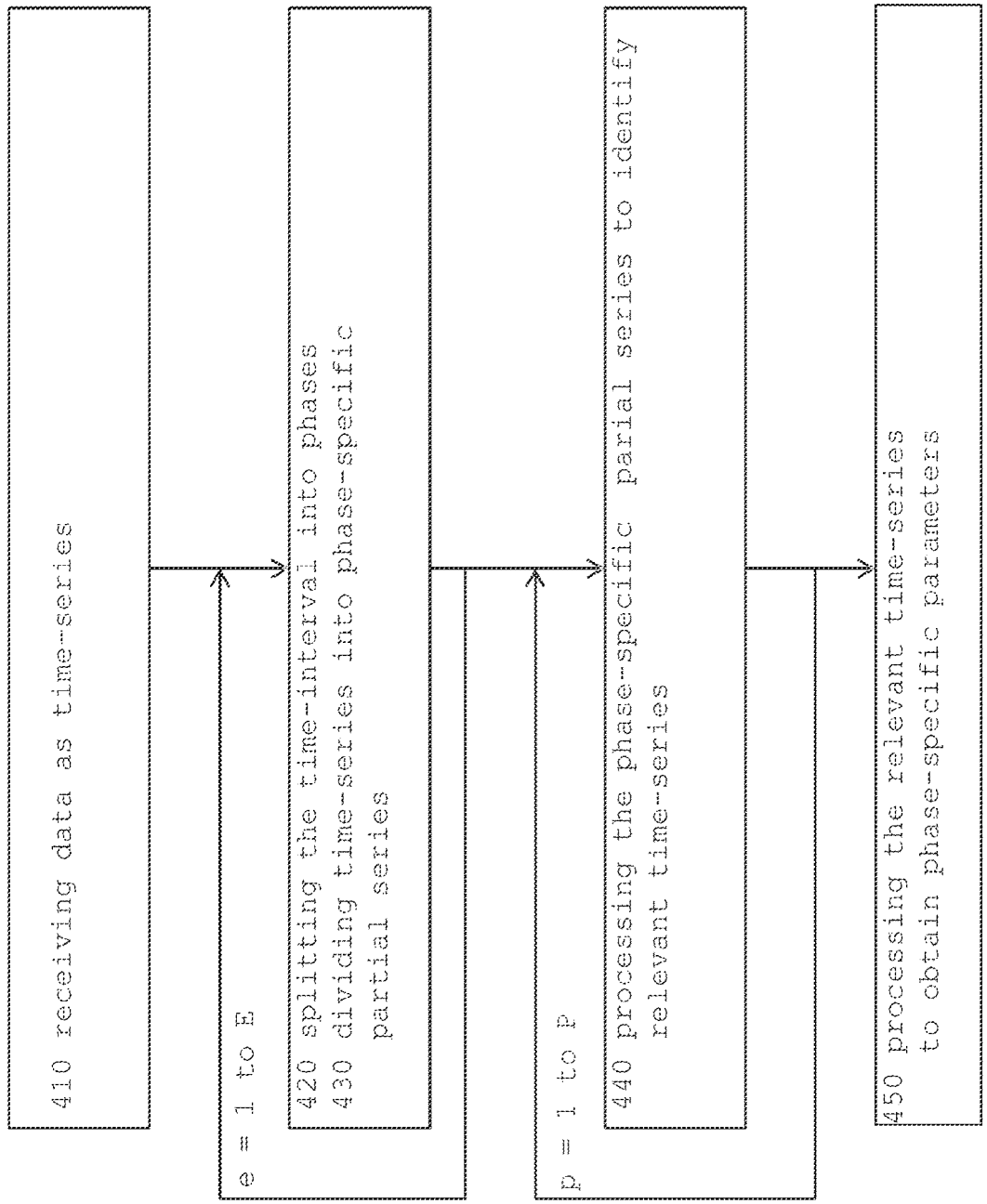
FIG. 11 illustrates a flowchart of a computer-implemented parameter obtaining method.

For a second purpose, details to be explained with FIGS. 10-11, parameter module 602 uses reference plurality 502 to obtain parameters 550 (or to fine-tune them).

The selection has been explained for simple binary criteria ((S) or (F)), but further criteria to identify data can be used as well, to name only a few:

selecting batch data according to the average or median length (i.e. number of K, duration interval of the batch-run)
  selecting according to the co-called STA-approach by Nomikos et al in "Monitoring batch processes using multi-way principal component analysis" AIChE Journal, 40.8 (1994): 1361-1375b
  other criteria, such as known attributes of particular batch-runs, usually obtained by empirical data, such as particular concentration of ingredients within substances, percentages for the presence or absence of particular chemicals to indicate purity, or other chemical attributes, attributes that are obtained by interacting human experts etc.

To summarize this, data is available from H historic batch-runs, but with every step, the number of candidate batch-runs is fine-tuned (and potentially reduced). As explained, data is discarded (or "dropped", H>E). It is also contemplated to add batch-run data from other repositories (merge batch data).

8 Sensitivity to Parameters

FIG. 8 illustrates control module 604 and a selection of parameters 540. Thereby, the figure shows the sensitivity of the module to parameters that are not phase-specific. Parameters 540 could be used instead of parameters 550 (cf. FIG. 1).

For the example, it is assumed that control module 604 receives reference plurality 502 (E multi-variate time series $\{\{D\}\}_1$ to $\{\{D\}\}_E$ cf. FIG. 7, from historic batch-runs, serving as references for "success").

Control module 604 would also receive interaction-time data 504 also in the form of multi-variate time series $\{\{D\}\}'$.504/$\{\{D\}\}'$ is "new" in the sense that a quality indicator is not yet known. Visualization 670 would show black dots 671 for the reference runs; and white dot 675 for $\{\{D\}\}'$. Color coding is used here only to enhance the illustration, but there is no need that control module 604 differentiates the appearance of the dots.

While control module 604 receives the multi-variate time series with substantially all their uni-variate time series, parameters 540 instructs control module 604 on how to process individual time series. In the example, the parameters are (binary) selection parameters that differentiate uni-variate time series to be processed from uni-variate time-series to be ignored.

In a first case (illustrated above), control module 604 processes uni-variate time-series $\{D_2\}$ $\{D_3\}$ $\{D_4\}$ $\{D_5\}$ but disregards $\{D_1\}$. In the second case (illustrated below), module processes $\{D_2\}$ $\{D_3\}$ $\{D_5\}$ but disregards $\{D_1\}$ and $\{D_4\}$. Selective processing is also illustrated by parameters 540 in form of a parameter vector with V processing flags, one flag for each uni-variate time series. As in the example, the symbol 1 indicates a particular uni-variate time series $\{D_v\}$ is being processed (i.e. passed for processing by aggregator 504-B), the symbol 0 indicates non-processing (i.e., blocking). (Other symbols can be used as well; the symbols are not necessarily binary symbols).

In vector notation, parameter vectors are $\phi_1=(0, 1, 1, 1, 1)$ above and $\phi_2=(0, 1, 1, 0, 1)$ below. The consequence of (in the example) ignoring $\{D_4\}$ is the uselessness of visualization 670 (and of the 690 if used in the alternative).

In the first case, visualization 670 would show the black dots in one quadrant; and the white dot in a different one.

The operator can recognize that the new batch-run does not has the same "success" quality as the references. For the operator this is a useful indication of the status of technical equipment 110 as a technical system. The operator can react, for example by interacting with the equipment similar as with the reference batch-run.

In the second case, visualization 670 would show the black dots distributed over three quadrants; and the white dot in one of them. For the operator is it not visible of the new batch-run has the quality as its historic predecessors or not.

To summarize this: parameters 540 influence the operation of control module 604. However, an inappropriate parameter selection can prevent the identification of the quality indicator with acceptable accuracy.

To improve this (i.e. to solve that problem), there are two major approaches:

In a first approach, the parameters 540 (in the vector) can be expanded to parameters 550 (e.g., in parameter matrix Φ) that considers the different phases. The parameters are no longer end-to-end-parameters by phase-specific parameters. The accuracy can be improved from "end to end".

In a second approach, parameters 550 for the different phases can be obtained by training (from reference data 502 with known quality, in application of parameter obtaining method 402)

For both approaches, using the knowledge of expert users is optional. As mentioned above, the description refers to semantics with the purpose to enhance understanding.

9 Phase Specific Parameters

FIG. 9 illustrates control module 604 and parameters 550 that are phase-specific, and thereby shows an improved approach. As FIG. 8, control module 604 is illustrated twice, to show its operation with different parameters 550. FIG. 9 differentiates P=2 phases, but it is assumed that the example fits to the example of FIG. 4 (with P=4 phases).

Visualization 670 is illustrated as 670-1 for phase 1 and as 670-2 for phase 2. It is also assumed that historic data 501/{{D}}' results from a failed batch-run (as in the example of FIG. 8). Visualizing phase-specific quality indicators allows operator 150 to derive conclusions regarding the batch-run technical equipment 110 is currently processing (through data 504 being real-time data).

The description will now explain how parameter module 602 obtains parameters 550 by processing the reference plurality 502 {{D}}$_1$ to {{D}}$_E$, cf. FIG. 7.

10 Parameters

FIG. 10 illustrates reference plurality 502 (cf. FIG. 7). FIG. 10 also illustrates parameters 550 in form of parameter matrix Φ. The details will be explained in connection with the flowchart of FIG. 11.

11 Flowchart

FIG. 11 illustrates a flowchart of computer-implemented parameter obtaining method 402. Method 402 is performed by parameter module 602. FIGS. 10-11 in combination illustrate how parameters 550 can be derived from reference plurality 502.

In step receiving 410, parameter module 602 receives (from technical equipment 110) reference plurality 502 of multi-variate time series {{D}}$_1$ ... {{D}}$_e$ ... {{D}}$_E$ comprising data obtained during historic batch-runs of the production process (cf. FIG. 5, pre-selected 501 to 502, by reference method 401).

Each multi-variate time series comprises data obtained from a particular reference batch-run. Based on an batch-run time interval ([$t_1$, $t_K$]) of the particular reference batch-run (K different for e), first time series 511 has data for first measurement values from a first source (120-1 in FIG. 4) that is related to technical equipment 110, and second time series 512 has data for second measurement values from a second source 120-2 that is related with technical equipment 110 as well.

In view of FIG. 4, this could be the time series for temperature {D1} and rotation {D2}, but the semantics are not relevant here.

Third time series 515 comprises data describing particular manufacturing operations during the batch-run of the particular reference batch-run. For this third time series, the semantics are relevant. The description of manufacturing operations is explained for the example with event descriptors 520-e that mark the start of the consecutive phases, cf. FIG. 4. In the example of FIG. 4, the event descriptors have been explained as the arrival instructions in {D5}.

Parameter module 602 executes the following steps 420 and 430 in separate mode that is separately for {{D}}1, separately for {{D}}e, and separately for {{D}}E. By way of example, the flowchart illustrates the separate mode as a loop.

In step splitting 420, parameter module 602 splits the batch-run time interval ([t1, tK]) into phases, being consecutive time intervals ([t11, t1N] or phase 1, and [t21, t2N] for phase 2, N being phase-specific). The notation [1, N1], [1, N2] simplifies the indices. Step 420 can be seen as processing along a first index direction (along index k, cf. FIG. 3, here from left to right). As intermediate results, the E different time intervals [t11, t1N]e are split into phases.

In the example, the transition between the phases is determined by the time-points of event descriptors 520-e. Phases have been explained above in connection with FIG. 4. FIG. 10 is simplified by showing 2 phases 1 and 2 only.

Still in separate mode, parameter module 602 applies the phase division to the data values as well. In other words, parameter module 602 executes step dividing 430 time-series into phase-specific partial series (P=2 in the example).

As intermediate results, data is available in phase-specific uni-variate time series 511-1 (for phase 1) and 511-2 (for phase 1), from (first) time series 511, phase-specific uni-variate time series 512-1 (for phase 1) and 512-2 (for phase 1), from (second) time series 512.

The phase-specific uni-variate time series are particular to the reference index e.

For simplicity of explanation, the terms are simplified to particular phase-specific first partial series 511-1, 511-2 and particular phase-specific second partial series 512-1, 512-2. More in general, the dividing step divides {{D}}$_e$ into D(v, p)$_e$ (partial series with the three indices v for source, p for phase, e for reference.

Of course, D(v, p)$_e$ comprises data values in a sequence [1, $t_K$]. (For identifying a particular data value, index k would be the fourth index.)

In a different notation (with multi-variate), the phase-specific time series are {{D}}$_{e1}$ and {{D}}$_{e2}$. The phase index p given here is the second index. Phase-differentiated data is available for the reference plurality of E references (reference plurality 502 is divided into phase sets).

For step processing 440, parameter module 602 changes the index direction. It goes through the data by reference index e (from e=1 to E). Module 602 also changes to combine mode.

For each phase separately (single-line arrows 430), parameter module 602 differentiates the first phase-specific time series and the second phase-specific second time-series to be relevant or non-relevant. Relevance (non-relevance) is determined by inspecting the particular phase-specific time series from the reference, by reference index.

Just taking phase 1 as the example, there are series partial series 511-1 for e=1, for e=2 and so on until e=E, and series partial series 512-1 for e=1, for e=2 and so on until e=E.

There are many criteria (or relevance rules) to determine relevance or not, and the person of skill in the art can identify them according to relevance rules. To name only a few criteria:

magnitude of data values within a pre-defined threshold band (minimal-maximal band), data values in particular relation to standard deviation of normal distribution (Gauss distribution), such as being outside the standard, a signal-to-noise ratio (SNR), similarity distances obtained by using DTW techniques to compare the E partial time-series (An overview to DTW and to DTW-software is available, for example, in Toni Giorgino: "Computing and Visualizing Dynamic Time Warping Alignments in R: the dtw Package" (Journal of Statistical Software Vol 31 (2009), Issue 7). Alignment distances can be related to a pre-defined threshold so that relevance can be determined accordingly.

For simplicity of explanation, relevance of a uni-variate time series is given by way of example if the data values for all instances e=1 to E (i.e. in combine mode)exceed a minimal-maximal band of 0.1.

Assuming normalized data values [0,1], there are $N_1*E$ data values in 511-1 (e=1 to E, combine mode), such as 0.5, 0.55., 0.48, 0.47 . . . 0.5. All of these $N_1*E$ data values remain approximately at 0.5. These minimal changes do not lead to relevance. Looking at 511-2 (e=1 to E, combine mode), the $N_1*E$ data values are 0.5, 0.6, 0.7, 0.4 . . . 0.5. The difference between the minimal value 0.4 and the maximal value 0.7 exceeds the minimal-maximal band of 0.1. As a consequence, the time series 511-2 is relevant.

The flowchart illustrates step 450 processing the relevant time series to obtain phase-specific parameters as a separate step, but in implementations, parameters 550 are being stored as they become available.

Parameter module 602 stores the relevance determination as parameters 550 into matrix Φ, 1 for relevance, 0 for non-relevance. The example has two columns (for phases 1 and 2) and has two rows (for the first and second time series respectively).

As a result, the parameters 550 are made available as phase-specific parameters for use by control module 604 (method 404), in the example by matrix Φ.

Shortly returning to FIG. 1, control module 604 can then apply the parameters 550. According to the matrix Φ, filter 604-A would obtain {{D}}#with {$D_2$} of the first phase and with {$D_1$} of the second phase, and aggregator would derive quality indictor Q from that.

Parameters 550 in a 2*2 matrix D service as a much simplified example, and more illustrative parameters 550 are parameters 550-1 and 550-2 of FIG. 9, with matrix D with P=2 phases for V=5 sources. However, identifying the parameters as described herein is not an automation of a manual process.

Grouping and Combining

In case the parameters 550 are similar for subsequent phases, the parameters can be grouped. Looking at parameters 550-2 (of FIG. 9), the parameters are available for 2 phases only, but assuming the 4-phase example of FIG. 4 (that is still a simplification). In an example, phase-specific parameter vector could be $\phi_1=\phi_2(0, 1, 1, 1, 1)$ and $\phi_3=\phi_4=(0, 1, 1, 0, 1)$.

The partial series for phases 1 and 2 could be combined, and the partial series for phases 3 and 4 could be combined as well. A first quality indicators Q can be obtained for phases 1 and 2, and a second quality indicator for phases 3 and 4.

Since the parameters are adapted to particular phases (or phase groups), the performance of the tool (e.g., MPCA-tool in control module 604) is expected to be more accurate to monitor individual phases.

This has—at least—two advantages:

Results—such as phase-specific quality indicators—can result in an overall quality indicator for the batch-run as a whole (e.g. "success" for the batch if all phases or phase groups are "success" as well, operating in combine mode).

Deviations from reference batch-runs (i.e., deviations from normal process performance) can be detected earlier. (In the example, the operator could check the heater status in an early phase where the co-performance of the heater and the motor are still correctable).

DISCUSSION

As mentioned, computer 600 ignores the semantics (except the identification of phases) of the time series. The description now shortly returns to the example of FIG. 4 for that reference data is available for v=5 sources:

{D1} to {D4} with measurement data, and

{D5} with phase-differentiating event data

As in FIG. 7, there are E=3 batch-runs in the quality "success" with data in reference plurality 502.

Performing method 402 would potentially lead to parameters 550 in form of a (v, p) matrix with 1 for {D1} (temperature) and {D2} (rotation) in phases 2, 3 and 4. Parameters 550 would lead to visualization 670 (cf. FIG. 7) by that the black dots are in the same quadrant, potentially in multiple visualizations that are phase-specific.

Assuming that the instruction to switch off the heater (t21, FIG. 3) would be ignored, the status of the heater {D3} would remain ON. At t31 the instruction MOTOR ON arrives and shortly thereafter (from t39), the motor {D4} would have the status ON. This would lead to the status ON/ON in FIG. 4 that would be tolerable for a short time. Assuming that as a physical consequence, the temperature {D1} would rise. Due to the relevance of {D1}, the above-normal value would potentially shift the white dot (for the current batch-run, cf. FIG. 7) away from the black dot, this indicating a deviation from the reference. Visualization would indicate the status of the technical equipment (as a technical system), operator 150 can take corrective action (e.g., to switch off the heater).

Since aggregator 604-B uses phase-specific parameters, the control module 604 (with filter and aggregator) can be seen as using a phase-specific model.

Reference plurality 502 (the result from reference method 401) is available for time-intervals [t1, tK], but dividing step 430 (method 402) also create phase-specific references, that can be stored (e.g., in the repository). It is also possible to create phase-specific references that take the relevance information (from steps 440/450) into account.

Root Cause Analysis

As described, the quality indicator (visualized or not) can be used to indicate the status, but the operator can use the indicator to investigate root causes for deviations. In the example, there is potential anomaly by that an instruction to switch off the heater does not reach the heater.

Applicability of MPCA

As explained, control module 604 uses am MPCA tool as aggregator 604-B. However, other (aggregator) tools can be used as well. For example, clustering tools, tools that consider Partial Least Square (PLS) techniques.

12 Fine-Tuning the Parameters

Having explained method 402 to obtain parameters 550, the description now explains an approach to make parameters 550 more accurate (as selected parameters 550').

Figure 12:
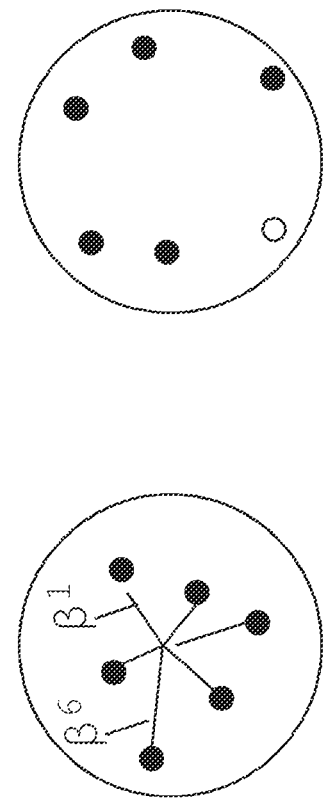
FIG. 12 illustrates a computer-implemented parameter adjustment method.
Figure 12:
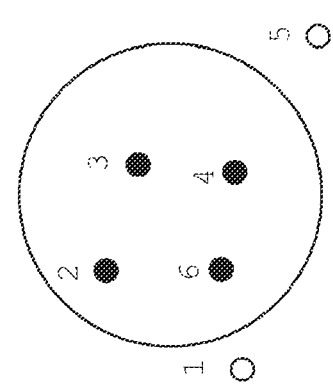

FIG. 12 illustrates computer-implemented method 403 to adjust parameters. Method 403 is not only illustrated by a traditional flowchart, but also by a symbolic illustration of the data being processed. Step references 470, 475, 480 and 485 are illustrated on the left side of the figure.

Parameter adjustment method 403 is an optional method that makes parameters 550 more severe in the sense of increasing the share of "block" and decreasing the share of "allow" (or "pass"). In other words, matrix $\Phi'$ would have more "0" elements than matrix $\Phi$. Aggregator 504-B would have to process less data, and would provide quality indicators Q that correspond to the reality with higher accuracy.

Parameter adjustment method 403 can be performed by parameter module 603 (cf. FIG. 1), but it is not completely performed by that module. Parameter module 603 can be regarded as an adjuster module. It has also a coordinating function that triggers activities by other modules.

The description stays with parameters 550 in the form of parameter matrix $\Phi$.

Parameter module 603 receives 470 a plurality 503 of historic batch-run data as multi-variate time series $\{\{D\}\}1$ to $\{\{D\}\}6$. The number of 6 batch-runs is just convenient for illustration. $\{\{D\}\}1$ to $\{\{D\}\}6$ is not necessarily identical with the data in reference plurality 502. $\{\{D\}\}1$ to $\{\{D\}\}6$ can be received from collection 501. (Using a super-script index makes the difference clear).

The batch-runs have known quality indicator of a target quality (e.g., "success" for all 6). There is no need that the quality indicator has been obtained by executing method 404 (for each batch-run). It is more suitable to have the batch-runs selected independently. Batch-runs 1-6 (with data $\{\{D\}\}$) are taken as calibration reference. In receiving 470, parameter module 603 can interact with a human expert user.

Parameter module 603 now modifies parameters 550 and provides a set of parameter variations. The figure illustrates this by taking matrix $\Phi$ (550-2, cf. FIG. 9) a start matrix 550-var-0, by removing "1" (not by adding "1") in variations 550-var-1 and 550-var-2, Parameter module 603 instructs instruct control module 604 to obtain 480 the quality indicators Q (by processing the multi-variate time series as described above for FIG. 1).

In the example, the quality indicators are shown by the location of dots in visualization. There are 6*3 indicators (dots) in total. For convenience, the visualization uses a circle (cf. FIG. 3, (B)).

Taking the 5-source, 2-phase matrix (from FIG. 8) as a start matrix, visualization 670 leads to 4 dots (batches 2, 3, 4, 6) within the circle and two dots outside (1, 5). The first variation (var-1) shows all dots (for the 6 references) within the circle, and the second variation (var-2) shows 5 dots inside and one dot outside. This leads to the assumption that the first variation is the more suitable parameter vector. Hence, $\Phi'$ of the first variation can be used for further processing data from production batch-runs as they arrive. In other words, $\Phi$ (550-2 in FIG. 9) has been optimized to D (550-var-1 in FIG. 12).

In this function, control module 604 does not operate with interaction-time data 504, but the function is the same as described above. Looking at the visualization is just a convenient way to explain the approach. Actually visualizing Q to the user is not required.

While in the example of FIG. 12, a user would recognize var-01 as parameter selection 550' for highest accuracy, parameter module 603 can make the selection by processing. This is illustrated by determining 485 differences of the obtained quality indicators. The variations (e.g., 550-var-1) for that the differences are minimal are then taken as selected parameters 550'.

The illustration in FIG. 12 is just an example. The distances $\beta$ from the dots (6 dots, for 6 references) to the center of the circle can be summed up for the variations. As illustrated, the sum of minimal for variation 550-var-1.

Adjusting the parameters can be regarded as a form of calibration. It is therefore suitable to receiving (step 470) time series from batch-runs for that the quality indicators indicate the same quality (in the example "success").

However, this is not mandatory. The person of skill in the art can modify the approach by mixing reference batches. For example, batches 1 and 5 could be taken from a known different quality (here: failure), and batches 2-4 and 6 could be taken from a "success batches". In this case, the failure batch would be shown by a white dot. For parameters 550/550' that lead to acceptable accuracy, the white dot would be located outside the circle (as illustrated for the example on the left side only).

In view of the difference calculation, a criterion could be the maximal distance (of Q) between for batches with opposite quality (e.g., optimal parameters for largest distances between black and white dots).

Those of skill in the art can apply statistical methods, such as group quality indicators into clusters or the like. Clustering approaches are known in the art. Outliers can be ignored by using robust approaches, such as applying median calculations instead of average calculations.

As a further aggregation, a separation of different clusters (i.e. quality indicators for success/failure) can leads to a separation measure that indicates suitability (non-suitability) of the parameters. In this respect, the identification of so-called false negatives and false-positives is mentioned as well.

There many alternatives possible. It is noted that there is no need to provide further modules, the functionality some modules (e.g., of the control module) can be re-used.

13 Generic Computer

Figure 13:
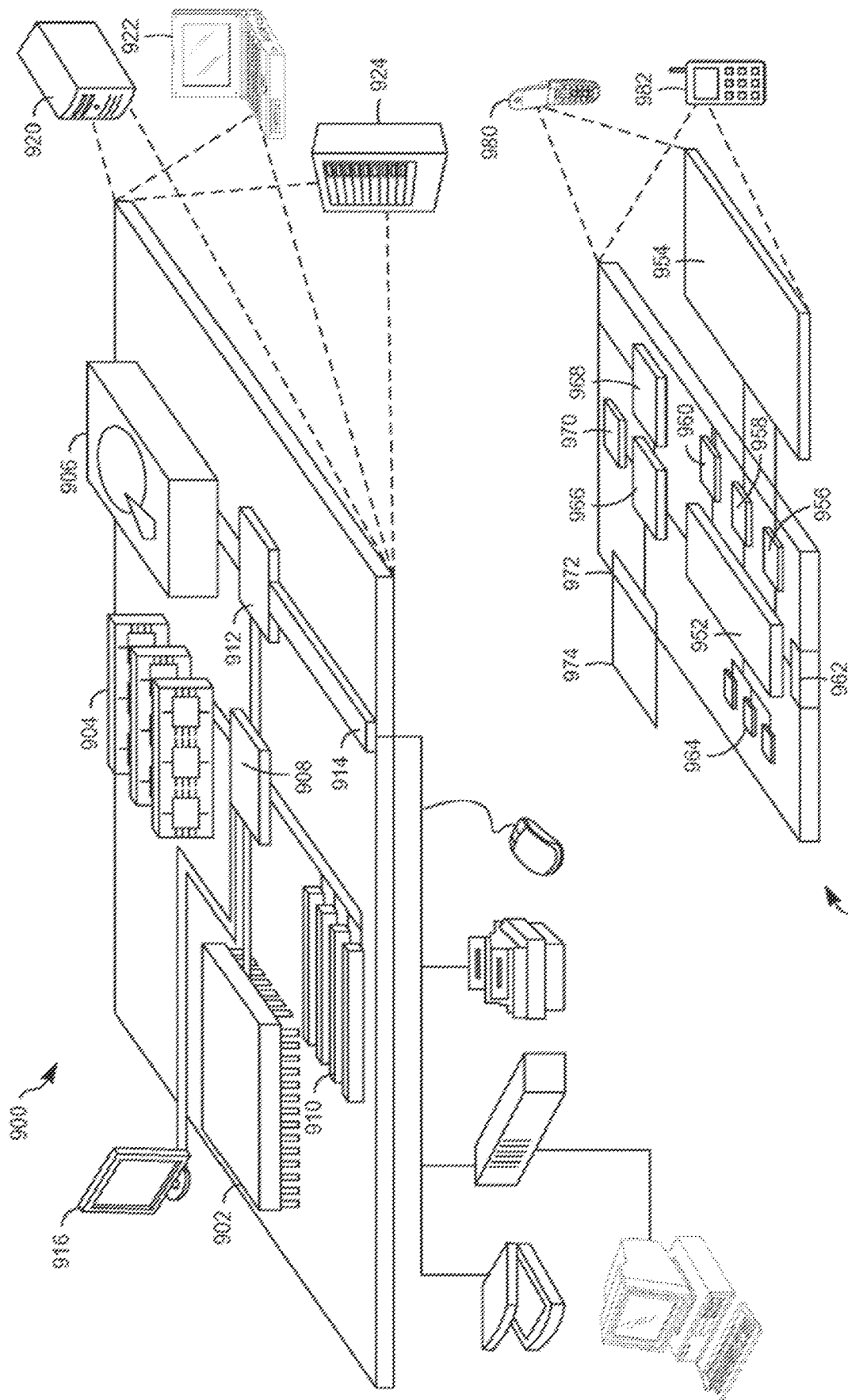
FIG. 13 illustrates an example of a generic computer device and a generic mobile computer device, which may be used with the techniques described here.

FIG. 13 illustrates example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to computer 600 of FIG. 1. Computing device 950 is intended to represent various forms of mobile devices, such as personal digital assistants, cellular telephones, smart phones, and other similar computing devices. For example, computing device 950 may include the data storage components and/or processing components of devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for obtaining parameters to be used by a control module of a computer, wherein the control module is adapted to control technical equipment by processing batch-run data from the technical equipment, the method comprising:

receiving, from technical equipment that has performed a production process, a reference plurality of multi-variate reference time series, wherein the multi-variate reference time series are based on time points of a batch-specific batch-run time interval and comprises data values from sources that are related to the technical equipment, wherein each multi-variate reference time series comprises:
  a first time series from a first source, with data for first measurement values,
  a second time series from a second source, with data for second measurement values, and
  a third time series from a third source, with data describing particular manufacturing operations during the batch-specific batch-run time interval;

splitting, for each multi-variate reference time series of the plurality separately, the batch-specific batch-run time interval into a plurality of phases, the phases being consecutive time intervals, by determining transitions between the particular manufacturing operations, and dividing the first time series into particular phase-specific first partial series and the second time series into particular phase-specific second partial series;

processing, for each phase separately, and for the phase-specific partial series in combination, the phase-specific partial series to differentiate the plurality-related phase-specific time series into relevant partial time series or non-relevant partial time series according to relevance rules;

storing relevance information as the parameters, wherein storing the relevance information is executed by providing a parameter matrix with binary elements that selectively allow or block the control module of the computer to process the batch-run data from the technical equipment;

receiving a plurality of further multi-variate time series, from batch-runs for which the quality indicators are already available;

providing a set of parameter variations of the parameter matrix by toggling parameters that allow to elements that block;

obtaining for each parameter variation, and for each further multi-variate time series, quality indicators by processing the multi-variate time series; and determining differences of the obtained quality indicators and taking the variation for which the differences are minimal as selected parameters.

2. The method according to claim 1,
wherein receiving is executed for multi-variate reference time series pre-selected from a collection of multi-variate historic time series, with data from historic batch-runs.

3. The method according to claim 1,
wherein receiving is executed for a plurality of multi-variate time series that has been pre-selected from a collection of multi-variate time series from historic batch-runs, with the criterion to select multi-variate time series from historic batch-runs that conform to a particular target quality indicator.

4. The method according to claim 1,
wherein splitting is performed by determining the transition between the phases according to time-points of event descriptors that belong to the data of the third time series.

5. The method according to claim 1, wherein processing to differentiate is executed by evaluating any of the following relevance rules, using:
magnitude of the data values within a pre-defined threshold band,
relation of the data values to a standard deviation of a normal distribution,
signal-to-noise ratio,
Dynamic Time Warping distances,
identification of time series that are correlated, and/or
identification of outliers in disturbed time series.

6. The method according to claim 1,
wherein receiving comprises receiving multi-variate time series from batch-runs for which the quality indicators indicate the same quality.

7. The method according to claim 1, further comprising aggregating, using the control module, data from a particular interaction-time batch-run of the technical equipment into a status indicator of the technical equipment,
wherein the control module uses the parameters to selectively filter out the data according to particular sources and particular phases prior to aggregation.

8. A computer system adapted to execute the method according to claim 1.

9. A computer program product that, when loaded into a memory of the computer and being executed by at least one processor of the computer, performs the computer-implemented method according to claim 1.

10. The method according to claim 1, wherein the control module, using the parameters obtained by executing the computer-implemented, aggregates data from a particular interaction-time batch-run of the technical equipment into a status indicator of the technical equipment,
wherein the control module uses the parameters to selectively filter out the data according to particular sources and particular phases prior to aggregation.

11. A computer-implemented method for identifying a quality indicator for a particular batch-run, the method comprising:
reading the relevance information as the parameters according to claim 1,
filtering data according to the parameters that are source-specific and that are phase-specific, and
aggregating the data.

12. The method according to claim 11, further comprising:
deriving, after aggregating the data, the quality indicator for each source- and/or each phase.

* * * * *